United States Patent [19]
Miyake et al.

[11] Patent Number: 5,777,667
[45] Date of Patent: Jul. 7, 1998

[54] ELECTRONIC CAMERA OPERABLE IN A DUAL SHOOT MODE TOGETHER WITH A CAMERA WITH A FILM

[75] Inventors: Izumi Miyake; Ryuji Kawaguchi, both of Asaka, Japan

[73] Assignee: Fuji Photo Film Co., Ltd., Kanagawa, Japan

[21] Appl. No.: 867,819

[22] Filed: Jun. 3, 1997

Related U.S. Application Data

[63] Continuation of Ser. No. 596,399, Feb. 2, 1996, abandoned.

[30] Foreign Application Priority Data

Feb. 14, 1995  [JP]  Japan ................................. 7-025290

[51] Int. Cl.$^6$ ........................... H04N 7/18; H04N 9/64; G03B 29/00
[52] U.S. Cl. ............................. 348/64; 348/224; 348/229; 354/76; 354/81
[58] Field of Search ...................... 348/64, 224, 229, 348/371, 375; 354/76, 81

[56] References Cited

U.S. PATENT DOCUMENTS

| | | | |
|---|---|---|---|
| 4,825,324 | 4/1989 | Miyake et al. | 360/35.1 |
| 5,006,871 | 4/1991 | Noble | 348/64 |
| 5,122,821 | 6/1992 | Nealon | 354/76 |
| 5,307,168 | 4/1994 | Tashiro | 348/64 |
| 5,329,325 | 7/1994 | McClellan et al. | 354/76 |
| 5,546,121 | 8/1996 | Gotanda | 348/64 |
| 5,581,299 | 12/1996 | Raney | 348/64 |

Primary Examiner—Tommy P. Chin

[57] ABSTRACT

An electronic camera system includes a shutter controller for sending a drive signal to the shutter of a camera loaded with a silver halide sensitive type of film. The drive signal is synchronous to a release signal generated when a release button is pressed, and causes the shutter of the camera with the film to open. The release signal is also applied to a dual shoot controller included in the electronic camera. In response, the dual shoot controller feeds release signals to a synchronizing signal generator and a system controller. In response, the synchronizing signal generator delivers to a solid-state imaging device a drive signal synchronous to the release signal fed to the synchronizing signal generator, without regard to the output signal of a reference oscillator. As a result, an electronic shutter included in the imaging device is opened, and charge is stored in the imaging device. In response to the release signal, the system controller immediately feeds a shoot start command to the various sections of the electronic camera.

27 Claims, 14 Drawing Sheets

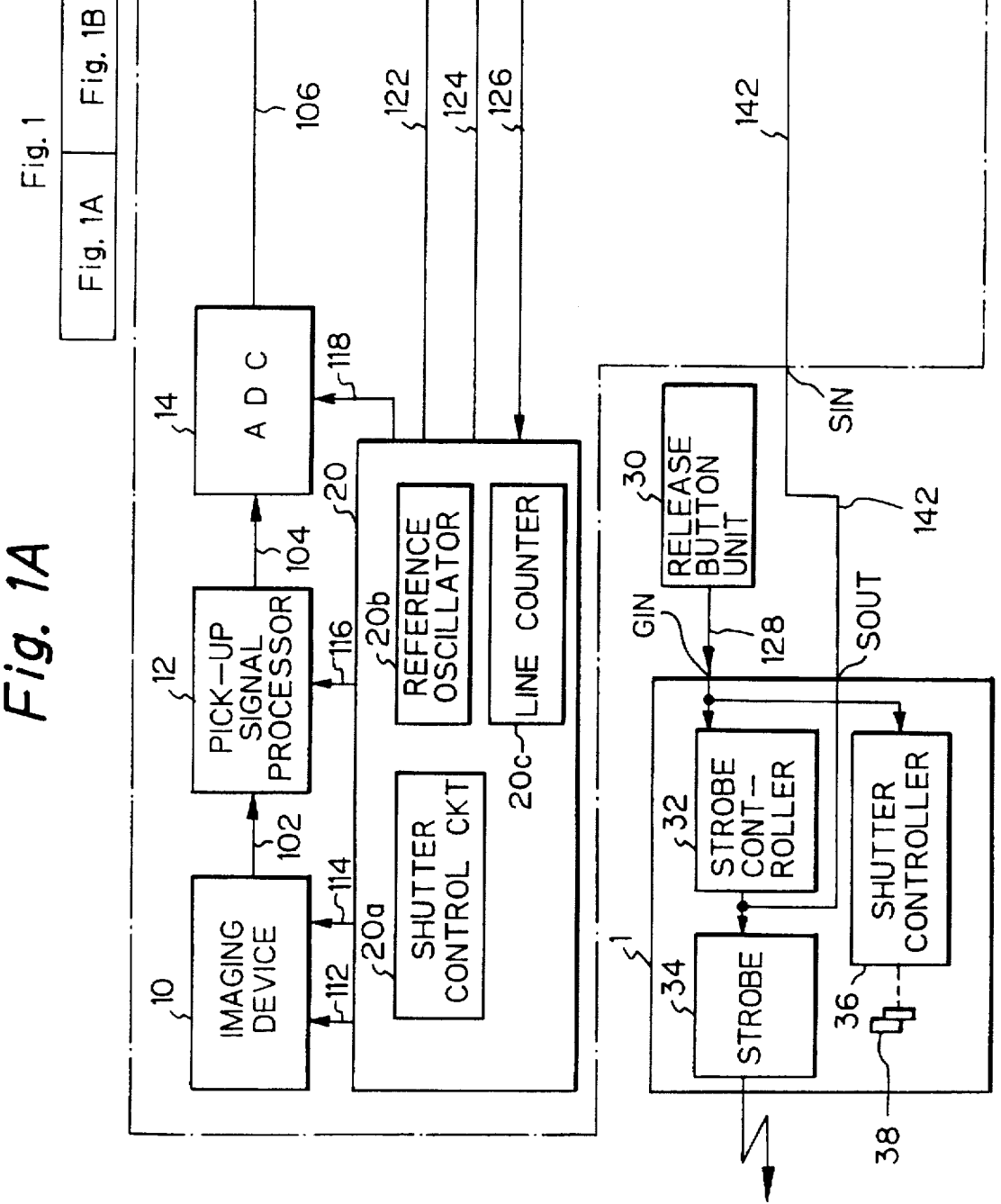

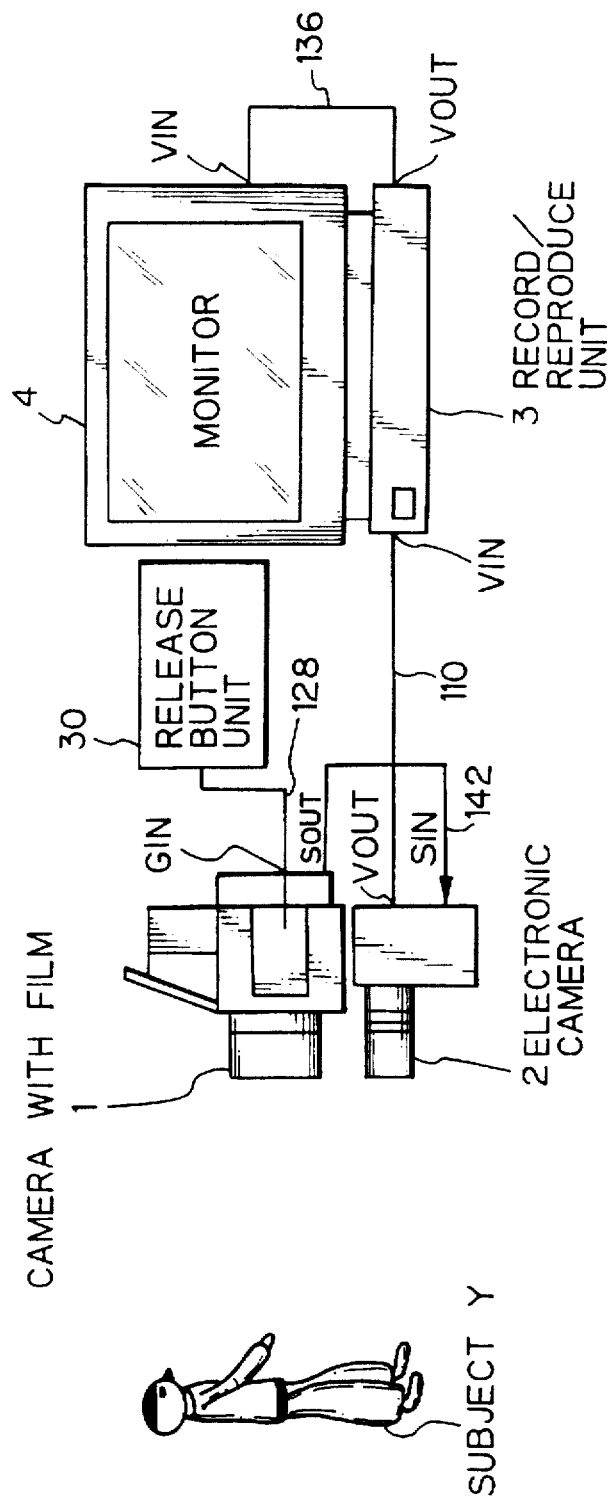

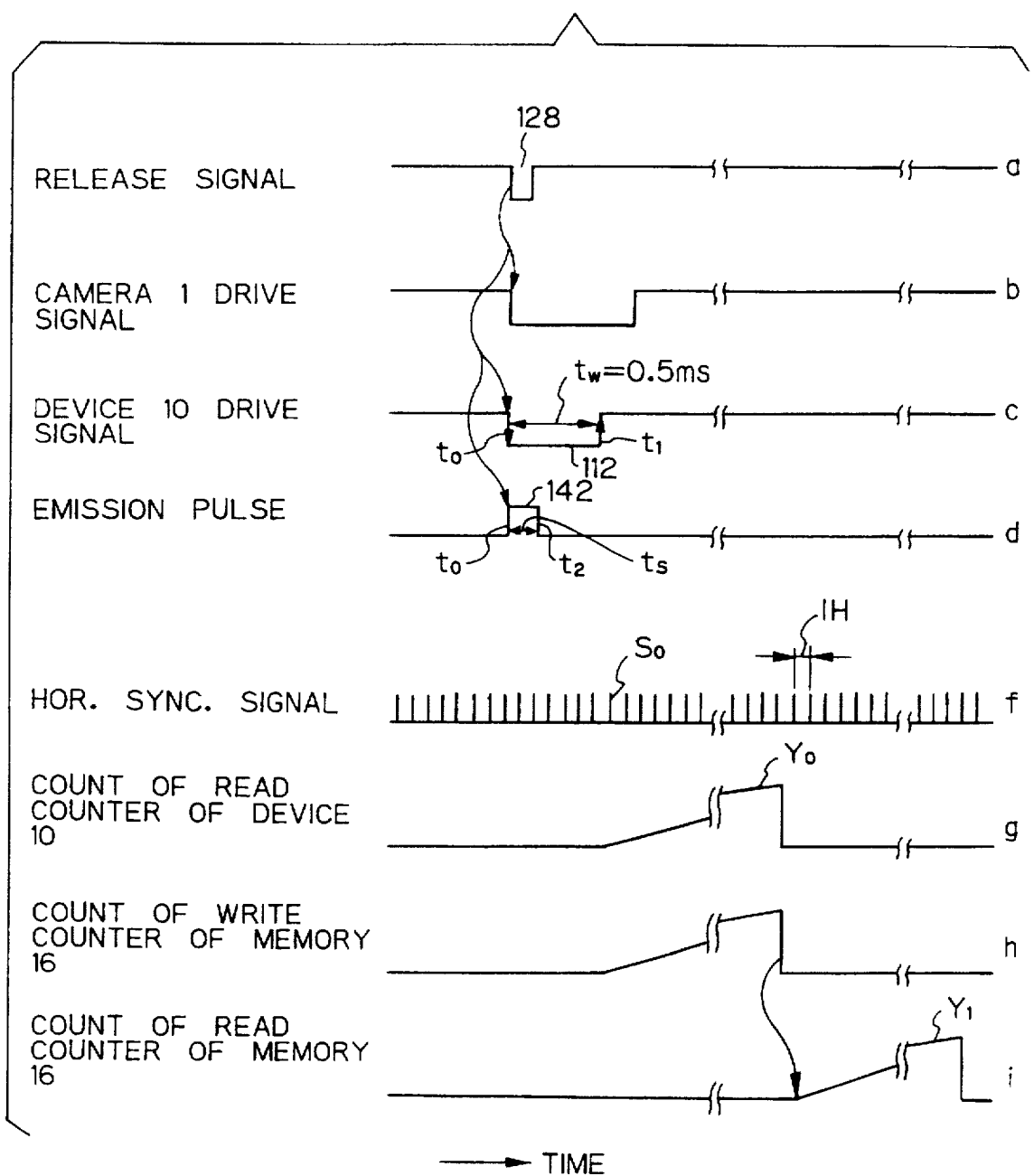

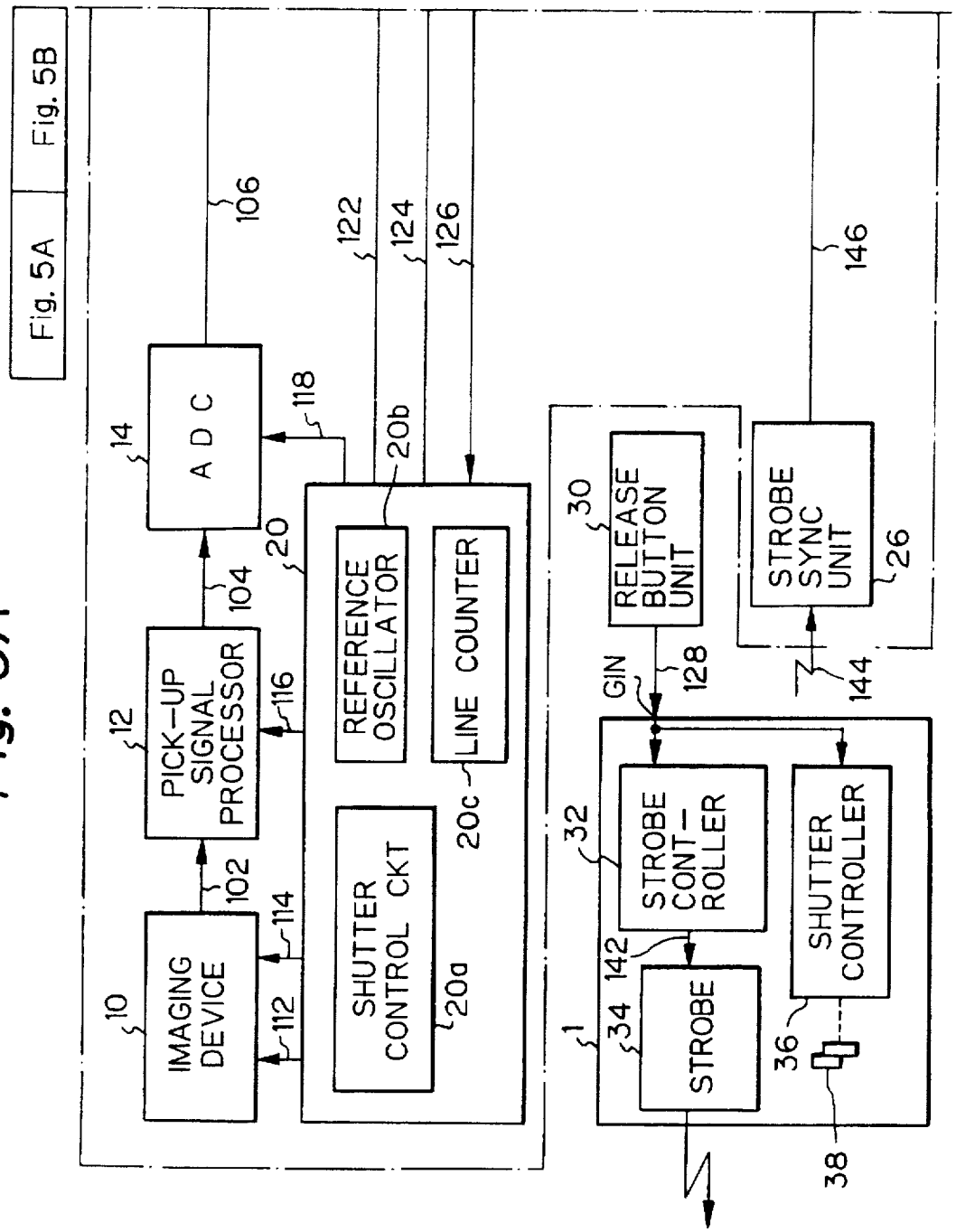

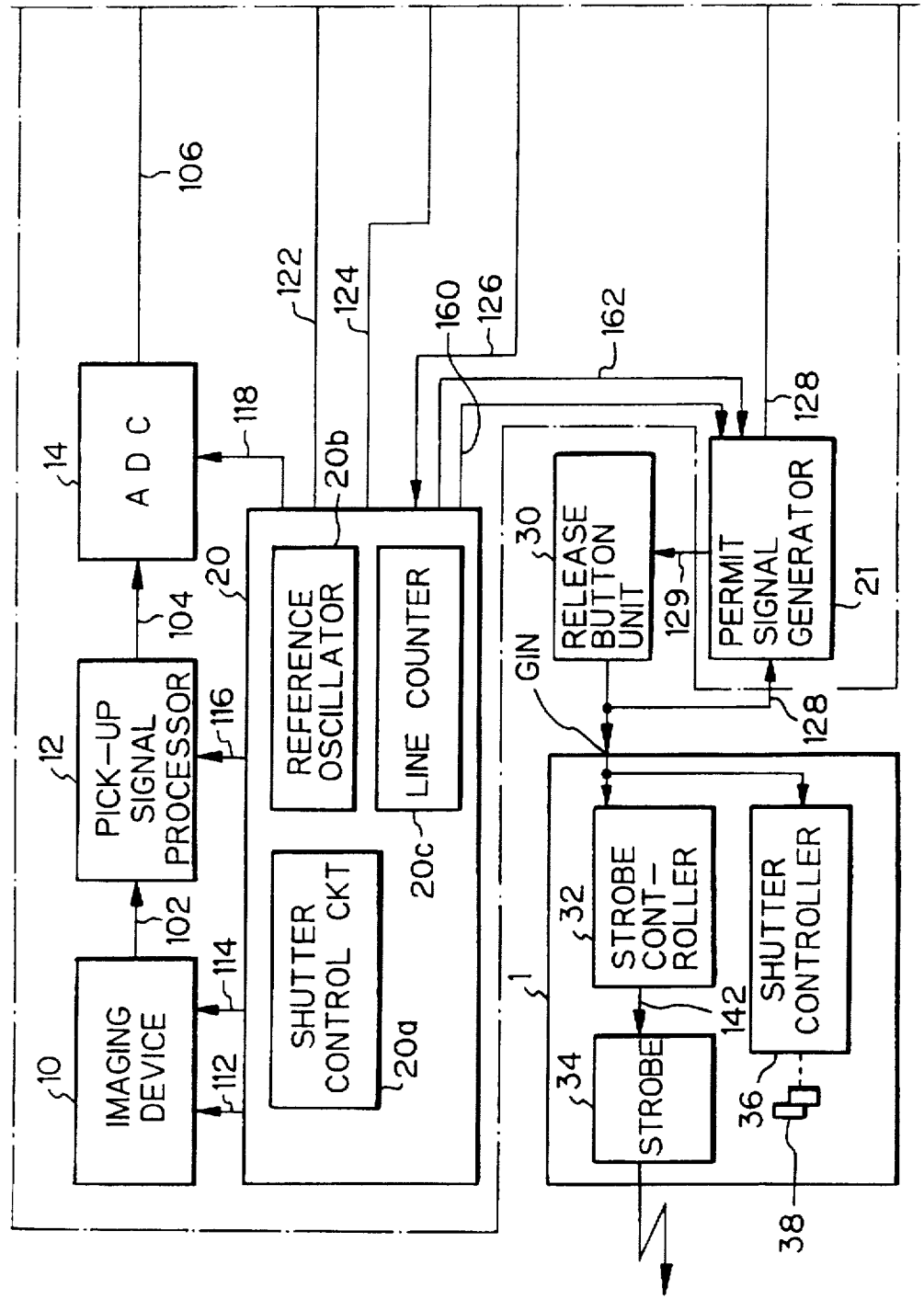

ELECTRONIC CAMERA OPERABLE IN A DUAL SHOOT MODE TOGETHER WITH A CAMERA WITH A FILM

This application is a continuation of application Ser. No. 08/596,399 filed on Feb. 2, 1996, now abandoned.

BACKGROUND OF THE INVENTION

1. Field of the Invention

The present invention relates to an electronic camera and, more particularly, to an electronic camera advantageously operable in a dual shoot mode together with a camera loaded with a silver halide sensitive type of film in, e.g., a photo studio.

2. Description of the Background Art

An electronic camera usually includes circuitry for allowing the operator of the camera to shoot a desired subject with a strobe built in the camera. In the conventional circuitry, a timing generating circuit generates, e.g., an exposure timing signal for driving a CCD (Charge Coupled Device) image sensor or similar solid-state imaging device. A CPU (Central Processing Unit) receives the timing signal at a predetermined time. In response, the CPU generates a pulse for driving the built-in strobe and delivers it to the strobe.

To take a still picture, the CCD image sensor, for example, has its exposure timing mainly controlled by a vertical synchronizing signal. Hence, when the electronic camera and a camera loaded with a silver halide sensitive type of film are operated at the same time in order to shoot a single subject, it is necessary that the exposure timing of the camera with the film be synchronized to the vertical synchronizing signal of the electronic camera.

The conventional electronic camera, however, brings about some problems when operated simultaneously with the camera with the film in order to take a stroboscopic picture. For example, the CPU receives a timing signal assigned to the strobe via a port thereof which is different from a port to which the exposure timing signal is applied from the timing generating circuit. In response, the CPU generates a pulse and feeds it to the strobe built in the camera, thereby causing the strobe to emit light. As a result, a time lag exists between the emission pulse and the exposure timing signal. Further, if the CPU is not ready to deal with the strobe emission timing, i.e., if it is executing another processing, the generation of the emission pulse is further delayed.

Moreover, when the electronic camera and the camera with the film are operated at the same time in the dual shoot mode, the exposure timing and strobe emission timing must be synchronized to the vertical synchronizing signal of the electronic camera, as stated earlier. This cannot be done unless a shutter is provided with a complicated circuit arrangement for synchronization.

SUMMARY OF THE INVENTION

It is, therefore, an object of the present invention to provide an electronic camera operable together with a camera loaded with a silver halide sensitive time of film in a dual mode with simple circuitry without any time lag.

An electronic camera for shooting a subject, and recording a still picture representative of the subject of the present invention has a first releasing circuit for outputting a first release signal commanding the start of independent shooting of the electronic camera. An imaging device opens or releases, in response to a first drive signal, an electronic shutter to thereby store charges representative of the subject in a cell array, and reads, in response to a second drive signal, at least one frame of analog video signal corresponding to the charges out of the cell array. The imaging device is capable of performing a pinning operation. A dual shoot controller receives a stimulating signal commanding the start of dual shooting from the outside of the camera at a first input terminal thereof, developing the received stimulating signal on a first control line, receives a third release signal at a second input terminal thereof, and receives a select signal indicative of either the independent shooting or the dual shooting at a third input terminal thereof, and outputs the received stimulating signal through the second input terminal to the second control line if the select signal to the first control line is indicative of the dual shooting, or outputs the third release signal if the select signal is indicative of the independent shooting. A synchronizing signal generator is connected to the first control line, and outputs, upon receiving the stimulating signal or the third release signal from the first control line, the first drive signal synchronous to the signal received, and outputs the second drive signal synchronous to a synchronizing signal, generated by a reference signal generator included in the synchronizing signal generator, and asynchronous to the first drive signal. A controller controls the entire camera in response to the stimulating signal received over the second control line, and outputs, in response to the first release signal received from the second releasing circuit, the third release signal on the first control line while controlling the entire electronic camera.

The controller feeds the select signal indicative of the dual shooting to the dual shoot controller. The synchronizing signal generator feeds, upon receiving the stimulating signal, the first drive signal to the imaging device and thereby opens the electronic shutter for shooting the subject, and then feeds to the imaging device the second drive signal starting at a predetermined position of the synchronizing signal, which appears after the electronic shutter has been closed by the first drive signal, and which is synchronous to the synchronizing signal to thereby cause at least one frame of analog video signal to be read out of the cell array.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The objects and features of the present invention will become more apparent from the consideration of the following detailed description taken in conjunction with the accompanying drawings in which:

FIG. 1 shows how FIGS. 1A and 1B are combined;

FIGS. 1A and 1B are block diagrams schematically showing an electronic camera embodying the present invention, and a camera loaded with a silver halide sensitive type of film and with which the electronic camera is operable in a dual shoot mode;

FIG. 2 is a view showing how various units, including the electronic camera of FIGS. 1A and 1B, are connected in a system;

FIG. 4 is a timing chart representative of the waveforms of signals to be generated in a dual shoot mode in the above embodiment as well as in alternative embodiments;

FIG. 5 shows how FIGS. 5A and 5B are combined;

FIGS. 5A and 5B are block diagrams schematically showing an alternative embodiment of the present invention;

FIG. 7 shows how FIGS. 7A and 7B are combined;

FIGS. 7A and 7B are block diagrams schematically showing another alternative embodiment of the present invention;

DESCRIPTION OF THE PREFERRED EMBODIMENTS

Figure 1B:
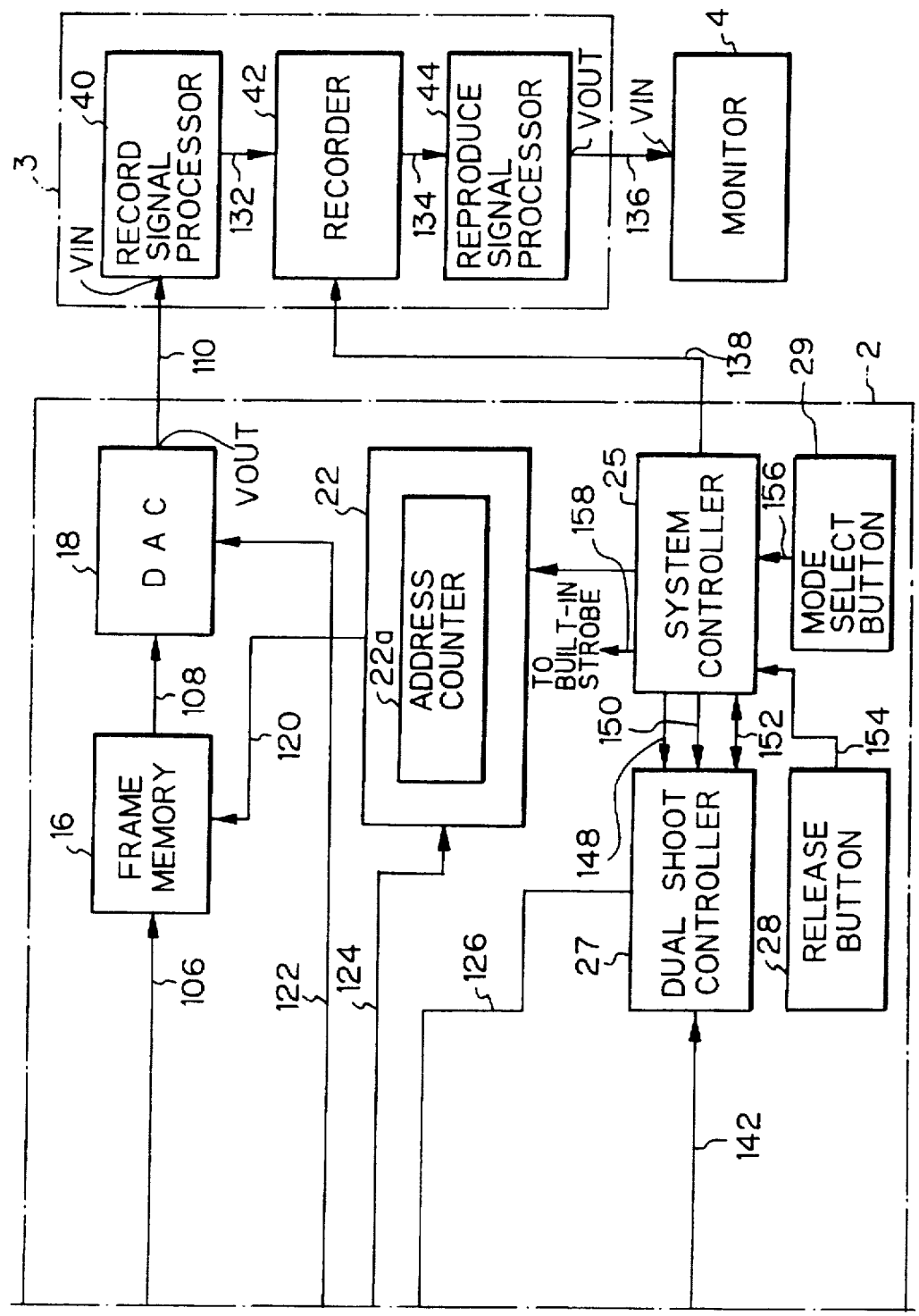

Referring to FIG. 2 of the drawings, a specific system arrangement including a camera 1 loaded with a silver halide sensitive type of film, and an electronic camera 2 embodying the present invention is shown. As shown, the cameras 1 and 2 each shoots a subject Y with its own strobe in response to a shutter release signal 128 fed from a release button unit 30. The camera 2 sends, e.g., one frame of a video signal representative of the resulting still picture to a recording/reproducing unit 3. The video signal from the camera 2 is written to the recording unit 3, and then read out of the reproducing unit 3, as needed. The video signal from the reproducing unit 3 is sent to a monitor 4 with the result that the still picture represented by the signal appears on the monitor 4. At the same time, the camera 1 records the picture in a silver halide sensitive type of film loaded therein.

The release button unit 30 is connected to the camera 1 which is, in turn, connected to the camera 2. The camera 2 has a recording medium implemented as a magnetic disk by way of example, and is connected to the recording/reproducing unit 3. In the illustrative embodiment, the unit 3 is assumed to record and reproduce video signals having an NTSC (National Television System Committee) format. Hence, the monitor 4 to which the recording/reproducing unit 3 is connected is also assumed to handle NTSC video signals.

Specifically, the release button unit 30 includes a release button (not shown), and has its output terminal connected to a release signal input terminal GIN provided on the camera 1 by a control line 128. When the release button of the release button unit 30 is pressed, the shutter release signal 128 is sent from the unit 30 to the camera 1. The camera 1 has an emission pulse output terminal SOUT connected to an emission pulse input terminal SIN provided on the camera 2 by a control line 142. An emission pulse 142 derived from the operation of the release button is sent from the camera 1 to the camera 2. A video signal output from the camera 2 and representative of the subject Y is sent from a video output terminal VOUT included in the camera 2 to a video input terminal VIN included in the recording/reproducing unit 3 over a signal line 110. Further, the video signal output from the reproducing unit 3 is sent from a video output terminal VOUT included in the unit 3 to a video input terminal VIN included in the monitor 4 over a signal line 136.

FIGS. 1A and 1B show the cameras 1 and 2 and recording/reproducing unit 3 in detail. As shown, the camera 1 has a strobe controller 32, a strobe 34, a shutter controller 36, and a shutter 38. The strobe controller 32 and shutter controller 36 have their input terminals connected to the release button unit 30 by the control line 128. The shutter controller 36 controls the opening and closing of the shutter 38 in response to the release signal 128 received from the release button unit 30.

The strobe controller 32, like the shutter controller 36, is connected to the release button unit 30 via the release signal input terminal GIN and control line 128. When the release button of the unit 30 is pressed, the release signal 128 (see waveform a, FIG. 4) is sent from the unit 30 to the controller 32. In response, the controller 32 outputs an emission pulse. Specifically, the emission pulse 142 (see waveform d, FIG. 4) goes high at a time $t_0$ at which the release signal or pulse 128 goes low, and then goes low at a time $t_2$; the interval $t_r$ between the times $t_0$ and $t_2$ is the duration of an emission. The output 142 of the controller 32 is connected to the input of the strobe 34 and the emission pulse output terminal SOUT. The strobe 34 is, e.g., a Xe (xenon) tube and emits light in response to the emission pulse 142 received from the controller 32. The strobe 34 may be implemented by a capacitor and discharge tube combination, if desired. Then, the controller 32 will be comprised of a trigger circuit for triggering the emission of the strobe 34, or a combination of such a trigger circuit and an emission time control circuit.

The camera 2 has a solid-state imaging device 10. For the imaging device 10, use may be made of a CCD image sensor capable of performing a pinning operation, as taught in, e.g., Japanese patent laid-open publication No. 113209/1994 applied by the same applicant as the present invention. Specifically, this type of image sensor exposes at any shutter timing without regard to the vertical synchronizing signal, reads out a video signal based on stored charges immediately after the exposure, and sweeps, during the other periods, charges stored in photodiodes thereof directly to a circuit board.

When the strobe controller 32 of the camera 1 sends the emission pulse 142 to the camera 2, the camera 2 generates a drive signal (see waveform c, FIG. 4) indicative of a high-speed shutter time. The drive signal causes the imaging device 10 to fully open its electronic shutter, so that the subject Y (FIG. 2) is shot in a single frame. It should be noted that the above drive signal is not synchronous to the output signal of a reference oscillator 20b included in a synchronizing (abbreviated as sync hereinafter) signal generator 20. A video signal representative of the single frame is immediately read out of the imaging device, 10 and then sent to the monitor 4. A clock and a horizontal sync signal (see waveform f, FIG. 4) for reading the video signal out of the imaging device 10 are synchronous to the output signal of the reference oscillator 20b. Hence, the drive signal c and horizontal sync signal f shown in FIG. 4 are not synchronous to each other.

The camera 2 has, in addition to the imaging or image pick-up up device 10 and sync signal generator 20, a pick-up signal processor 12 for processing the output signal of the imaging device 10, an analog-to-digital converter (ADC) 14, a frame memory 16, a digital-to-analog converter (DAC) 18, a memory controller 22, a system controller 25, a dual shoot controller 27, a release button 28, and a mode select button 29.

The CCD imaging device 10 with the previously mentioned pinning capability has imaging optics (not shown) arranged on its imaging surface (not shown). In the illustrative embodiment, the optics has its optical axis oriented toward and focused on the subject Y. The imaging device 10 has drive inputs 112 and 114 connected to drive outputs included in the sync signal generator 20, and has a video signal output 102 connected to the pick-up signal processor 12. When the sync signal generator 20 receives a command signal (in the embodiment, opposite in polarity to the waveform d, FIG. 4) from the dual shoot controller 27 over a control line 126, it feeds the drive signal c indicative of the high-speed speed shutter time (e.g. 1/2,000 second) to the drive input 112 of the imaging device 10. In response, the imaging device 10 fully opens its electronic shutter and thereby exposes its cell array. As a result, charges are stored in the cell array in accordance with the picture of the subject Y. When the imaging device 10 receives a drive clock from the sync signal generator 20 at the other drive input 114 thereof, it outputs on its video signal output 102 one frame of color video signal based on R (red), G (green) and B (blue) charges stored in the cell array. The imaging device 10 may output one field of video signal in place of one frame of video signal, if desired.

A line counter 20c is included in the sync signal generator 20. When the above one frame of video signal is read out of the imaging device 10, the line counter 20c counts lines, as represented by an analog waveform g in FIG. 4 for the illustrative purpose. Because the embodiment adopts the NTSC system having 525 scanning lines in total, the line counter 20c counts 483 lines, i.e., 525 lines minus 42 lines particular to the total blanking period of the first and second fields. The line counter 20c may be implemented as 483-bit counter.

The R, G and B video signal output from the imaging device 10 via a filter arrangement is applied to the input 102 of the pick-up signal processor 12. The signal processor 12 has some different functions, as follows. A first function is to produce R, G and B color signal components by sampling and holding the input R, G and B video signal. A second function is to produce a luminance signal Y and chrominance signals R-Y and B-Y out of the R, G and B color components. A third function is to execute white balance adjustment, gamma correction, and other conventional signal processing with the input video signal. Control signals for implementing such functions, e.g., horizontal and vertical sync signals are fed from the sync signal generator 20 to the signal processor 12 over a control line 116. The output 104 of the signal processor 12 is fed to the ADC 14.

The ADC 14 samples the input analog video signal 104 with sampling pulses which are fed thereto from the sync signal generator 20 over a control line 118, thereby transforming the analog signal to corresponding digital data having, e.g., eight bits. The digital data are delivered from the output 106 of the ADC 14 to the frame memory 16.

In the illustrative embodiment, the frame memory 16 is comprised of a RAM (Random Access Memory) capable of storing one frame of video data temporarily therein. The digital video data from the ADC 14 are written to the frame memory 16. The video data are read out of the memory 16 at a speed matching a writing speed available with the recording/reproducing unit 3, and they appear on an output 108. At this instant, a memory controller 22 feeds to the memory 16, control signals including an address signal and a clock. If desired, the above one frame of video data may be replaced with one field of video data, in which case the memory 16 will have a capacity great enough to temporarily store one field of video data therein.

The memory controller 22 has an address counter 22a for counting lines in the event that the video data are written to and read out of the memory 16. In FIG. 4, the count timings of the address counter 22a are represented by analog waveforms h and i for convenience sake. The counter 22a, like the line counter associated with the imaging device 10, may be implemented as a 483-bit counter capable of counting 483 lines. The video data Y, R-R and B-Y 108 output from the frame memory 16 are applied to the DAC 18. The DAC 18 transforms the input data Y, R-Y and B-Y to corresponding analog video signals, and then delivers them to the recording/reproducing unit 3 via its output 110. Control signals necessary for such digital-to-analog conversion are fed from the sync signal generator 20 over a control line 122.

The dual shoot controller 25 sends a command signal to the sync signal generator 20 over a control line 126. The command signal corresponds to a signal opposite in polarity to the signal d shown in FIG. 4. The sync signal generator 20 has a shutter control circuit 20a for generating, in response to the command from the above controller 25, a drive signal C shown in FIG. 4 and indicative of a high-speed shutter time. The drive signal c is delivered to the imaging device 10 via the output 112 of the sync signal generator 20. As shown in FIG. 4, the drive signal 112 represented by the waveform c goes low at the time $t_0$ at which the release signal 128 goes low, and then goes high at the time $t_1$. The interval $t_w$ between the times $t_0$ and $t_1$ is a period of time for which the electronic shutter remains fully open, i.e., an exposure time. The exposure time may be 1/2,000 second (0.5 millisecond) by way of example.

Further, the sync signal generator 20 has a self-running reference oscillator 20b capable of oscillating stably at a preselected frequency. In response to the drive signal from the shutter control circuit 20a or the command signal from the dual shoot controller 27, the reference oscillator 20b produces horizontal and vertical drive clocks necessary for the read-out of the imaging device 10 on the output 114, produces horizontal and vertical sync signals necessary for the signal processor 12 on the output 116, and produces sampling pulses necessary for the ADC 14 and DAC 18 on the outputs 118 and 122, respectively. In addition, the oscillator 20b produces on the output 124 sampling pulses and various kinds of sync signals, including horizontal and vertical sync signals, which are used to generate addresses and clock for the write-in and read-out of the frame memory 16.

In the illustrative embodiment, it is noteworthy that the drive signal indicative of the high-speed shutter time and appearing on the output 112 is not synchronous to any of the signals appearing on the outputs 114, 116, 118, 122 and 124. For example, the exposure timing for a shot (waveform c, FIG. 4) and the timing for reading out the resulting video signal (waveform g, FIG. 4) are fully asynchronous to each other. Hence, the exposure timing is not synchronous to the reference signal. This frees the exposure timing c from delay or time lag. Also, no time lags exist between the emission pulse (waveform d, FIG. 4) and the exposure timing (waveform c, FIG. 4)

The memory controller 22, receiving the various sync signals via its input 124, generate various timing signals necessary for the control over the write-in and read-out of the frame memory 16, e.g., a write address, read address, write enable signal, chip select signal, and clock. These signals appear on the output 120.

Figure 3:
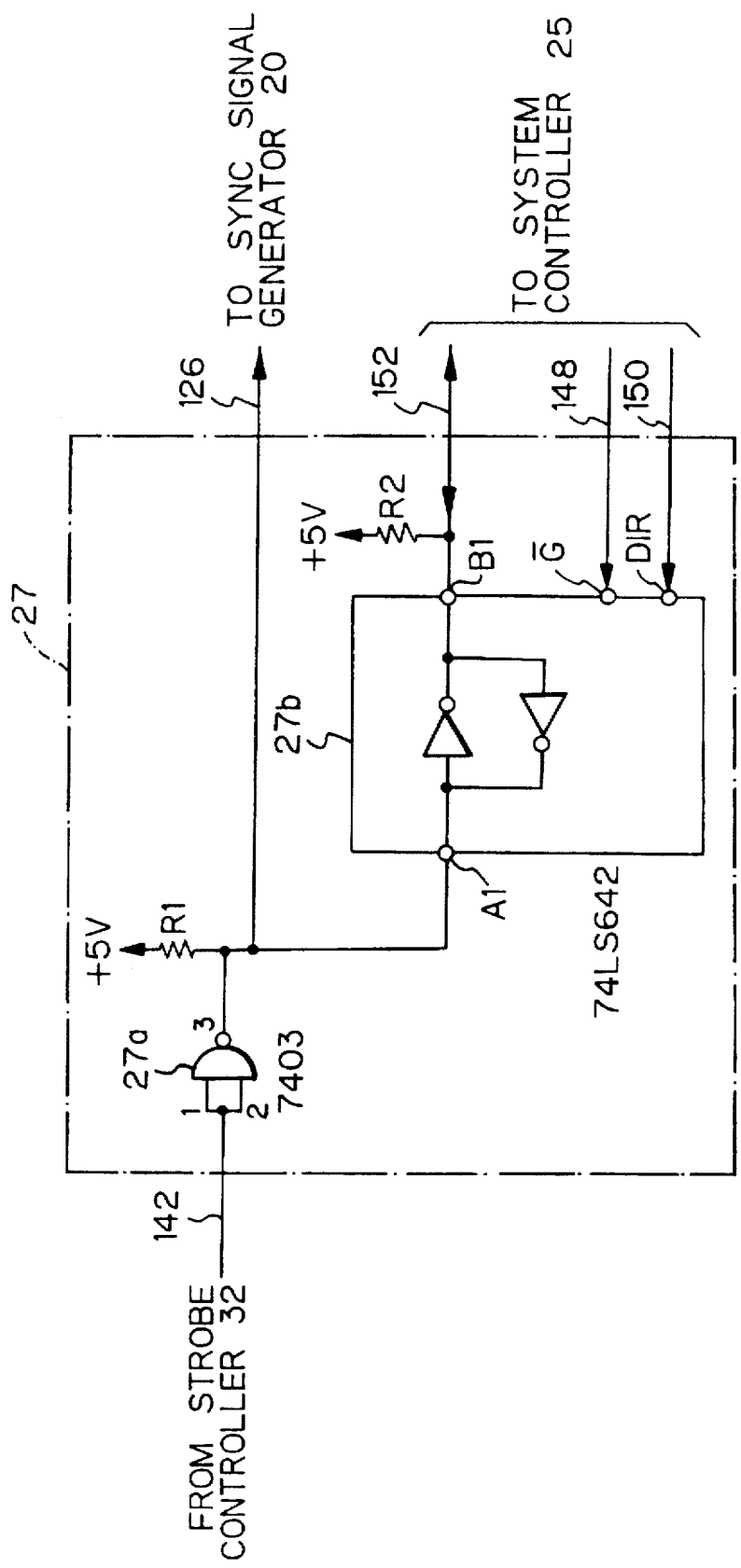
FIG. 3 is a block diagram schematically showing a specific construction of a dual shoot controller included in the embodiment.

Referring to FIG. 3, a specific construction of the dual shoot controller 27 included in the camera 2 will be described. When a dual shoot mode for causing the two different types of cameras 1 and 2 to operate at the same time is selected, the signals on the control lines 148 and 150 both are brought to the low level or logical ZERO. Then, the controller 27 inverts the polarity of the emission pulse 142 output from the strobe controller 32, and sends the resulting signal to the sync signal generator 20 and system controller 25 over the signal lines 126 and 152, respectively. On the other hand, in an independent shoot mode in which the camera 2 is to operate alone, the signals on the control lines 148 and 150 are respectively brought to the low level and a high level or logical ONE. In this mode, the controller 27 inverts the polarity of a shoot command signal 152 fed from the system controller 25, and sends the resulting signal to the sync signal generator 20. The controller 27 has an open-collector biinput NAND gate 27a (e.g. Model 7403 available from Intel), and an open-collector tristage bus transceiver 27b (e.g. Model 74LS642 also available from Intel).

The various sections constituting the camera 2 are controlled by the system controller 25. The release button 28 and mode select button 29 arranged on the camera 2 are each connected to a particular input port of the controller 25. When the camera 2 is used alone in the independent shoot mode, the release button 28 is pressed with the result that the release signal 154 is fed to the system controller 25. The mode select button 29 allows the operator to select either the dual shoot mode using both of the two different types of cameras 1 and 2 or the independent shoot mode using only the camera 2. When the button 29 is pressed, a mode signal 156 is fed to the system controller 25. A signal on the output 156 of the button 29 goes low when the independent shoot mode is selected or goes high when the dual shoot mode is selected.

In the illustrative embodiment, the system controller 25 may also advantageously be implemented by a microcomputer, i.e., a processing system including a CPU. When the mode signal fed to the input 156 of the controller 25 is in the low level indicative of the independent shoot mode, the controller 25 controls the operation of the entire camera 2 in response to the release signal 154 from the release button 28. Particularly, in the embodiment, the controller 25 causes its outputs 148 and 150 to go low when the mode signal 156 is in the low level or causes the outputs 148 and 150 to go low and go high, respectively, when the mode signal 156 is in the high level. Further, when the controller 25 receives the release signal 154 after the low-level mode signal 156, it delivers a command signal (corresponding to the waveform d, FIG. 4) indicative of the independent shoot mode via its output 152.

Assume that after the mode signal 156 has gone high to indicate the dual shoot mode, the controller 25 receives a command signal (corresponding to a signal opposite in polarity to the waveform d, FIG. 4) from the dual shoot controller 27 via the signal line 152. Then, the controller 25 again controls the operation of the entire camera 2. In the embodiment, the signal line 152 is basically comprised of a single line, and shared by the dual shoot command signal fed from the controller 27 to the controller 25 and the independent shoot command signal fed from the controller 25 to the controller 27.

The controller 25 generates an emission pulse for causing a strobe (not shown) built in the camera 2 to emit light. First, the controller 25 determines whether the built-in strobe is in an ON state or whether it is in an OFF state. If the strobe is in an ON state and if the controller 25 receives the release signal 154 from the release button 28 after the low-level mode signal 156, the controller 25 feeds the emission pulse to the strobe via its output 158. On the other hand, if the strobe is in an ON state and if the controller 25 receives the command signal 152 after the highlevel mode signal 156, the controller 25 also feeds the emission pulse to the strobe.

As shown in FIG. 1B, the recording/reproducing unit 3 has a record signal processor 40 and a reproduce signal processor 44, and a recorder 42. The input 110 of the record signal processor 40 is connected to the output 110 of the DAC 18 of the camera 2. The signal processor 40 transforms the analog video signals Y, R-Y and B-Y come in through the input 110 to a signal to be recorded in a magnetic disk or similar recording medium. Specifically, in the illustrative embodiment, a signal produced by the frequency modulation of the luminance signal Y and signals produced by the frequency modulation of the line-sequential chrominance signals R-Y and B-Y are applied from the DAC 18 to the signal processor 40. The signal processor 40 mixes such input signals and thereby produces a signal to be recorded in a magnetic disk. This signal is fed from the signal processor 40 to the recorder 42 via the output 132 of the processor 40.

The recorder 42 records the signal input from the signal processor 40 in a recording medium. In the embodiment, in response to a control signal fed from the system controller 25 to a control input 138, the recorder 42 records the signal coming in through the input 132 in a magnetic disk with a magnetic head or similar transducer (not shown). Further, the recorder 42 reads the recorded signal out of the disk and feeds it to the reproduce signal processor 44 via its output 134.

In the embodiment, the reproduce signal processor 44 reproduces the NTSC color video signal out of the signal received from the recorder 42. The color video signal is sent from the signal processor 44 to the monitor 4 via its output 136. As a result, the monitor 4 displays a still picture represented by the color video signal.

The camera 2, having the above construction, will be operated as follows. First, assume that the camera 2 is used in combination with the camera 1 in order to shoot the same object Y with a strobe, i.e., in a dual stroboscopic shoot mode. Then, the operator presses the mode select button 29 of the camera 2 so as to select the dual shoot mode. Subsequently, the operator presses the release button 30a of the release button unit 30. As a result, the release signal 128 is fed from the release button unit 30 to the strobe controller 32 and shutter controller 36 of the camera 1, as indicated by the waveform a in FIG. 4. In response to the negative-going edge of the release signal 128, the shutter controller 36 feeds to the shutter 38 a drive signal indicative of a short shutter time, as represented by the waveform b in FIG. 4. In the embodiment, the short shutter time is selected to be shorter than 1/60 second. The drive signal causes the shutter 38 to fully open. The strobe controller 32, also responsive to the negative-going edge of the release signal 128, sends the emission pulse 142 to the strobe 34 of the camera 1 and the dual shoot controller 27 of the camera 2. As a result, a film loaded in the camera 1 is exposed to record the subject Y therein. In the embodiment, the above emission pulse 142 has a duration $t_r$, as represented by the waveform d in FIG. 4.

In response to the emission pulse 142, the dual shoot controller 27 of the camera 2 delivers the shoot command signal 126 opposite in polarity to the pulse 142 to the sync signal generator 20. At the same time, the controller 27 feeds to the system controller 25 the shoot command signal 152 identical in timing with the above signal 126. In response to the command signal 152, the system controller 25 controls the operation of the entire camera 2 including the start of shooting and that of reproduction. On receiving the command signal 126, the sync signal generator 20 causes its shutter control circuit 20a to generate the drive signal 112 represented by the waveform c in FIG. 4. The drive signal 112 is fed to the imaging device 10. At the same time, the sync signal generator 20 causes its circuitry including the reference oscillator 20b to generate the drive clock 114. The drive clock 114 is also applied to the imaging device 10. The drive signal 112 and drive clock 114 are not synchronous to each other. In the embodiment, the drive clock 114 starts in synchronism with the first horizontal sync signal So (waveform f, FIG. 4) appearing after the time $t_1$ at which the drive signal 112 (waveform c, FIG. 4) goes high. The drive clock 114 has a frequency of 14.3 MHz by way of example.

The drive signal 112 input to the imaging device 10 causes the electronic shutter to fully open. As a result, charge is selectively stored in the cell array of the imaging device 10 in accordance with the input image of the subject Y. Subsequently, one frame of video signal is read out of the cell array in response to the drive clock 114. The video signal is delivered from the imaging device 10 to the pick-up signal processor 12 via the output 102 of the device 10. Specifically, one frame of video signal 102 consisting of valid 483 lines is read out of the imaging device 10 in response to the drive clock 114 which is in parallel in timing to the 483-bit line counter (waveform g, FIG. 4) included in the sync signal generator 20. The signal processor 12 transforms the input video signal 102 to the luminance signal Y and chrominance signals R-Y and B-Y by conventional signal processing including color separation. The signals Y, R-Y and B-Y are applied to the ADC 14 via the output 104 of the signal processor 12. The ADC 14 converts the input signals Y, R-Y and B-Y to corresponding digital data, and then delivers them to the frame memory 16.

The frame memory 16 receives a write control signal from the memory controller 22 via its control input 120. In response, the memory 16 writes the data 106 therein. The stored data are read out of the memory 16 and fed to the DAC 18 via the output 108 of the memory 16 under the control of a read control signal also fed from the memory controller 22. The writing of the data in the memory 16 is effected in synchronism with the count Yo of the 483-bit line counter (waveform h, FIG. 4), while the reading of the data out of the memory 16 is effected in synchronism with the count $Y_1$ of the line counter (waveform i, FIG. 4). The DAC 18 transforms the input data to the analog luminance signal Y and line-sequential chrominance signals R-Y and B-Y. These signals Y, R-Y and B-Y are applied to the record signal processor 40 included in the recording/reproducing unit 3.

The record signal processor 40 mixes the input signals, i.e., the signal produced by the frequency modulation of the luminance signal Y, and the signals produced by the frequency modulation of the line-sequential chrominance signals R-Y and B-Y. The resulting composite signal is fed from the signal processor 40 to the recorder 42. The recorder 42 records the input signal in the disk under the control of a control signal fed from the system controller 25 to its input 138. When the operator desires to see the picture of the subject Y taken by the camera 2 on the monitor 4, the operator manipulates the recording/reproducing unit 3. Then, the recorded signal is read out of the disk and applied to the reproduce signal processor 44 via the output 134 of the recorder 42. The signal processor 44 reproduces the NTSC color video signal out of the input signal, and then feeds it to the monitor 4. As a result, the still picture of the subject Y and represented by the color video signal appears on the monitor 4.

As stated above, in the dual shoot mode, when the release button of the release button unit 30 is pressed, the emission pulse 142 based on the resulting release signal 128 is input to the camera 2. In response, the camera 2 causes the imaging device 10 to fully open its electronic shutter. As a result, the camera 2 shoots one frame representative of the subject Y with the built-in strobe. Also, in response to the release signal 128, the camera 1 fully opens its shutter 38 and causes its strobe 34 to emit, thereby recording the subject Y in the film with the strobe 34. Immediately after the dual stroboscopic shot, the camera 2 reads the one frame of video signal out of the imaging device 10 in synchronism with the drive clock 114 which is not synchronous to the emission pulse 142. The video signal is applied to and recorded in the recording/reproducing unit 3. The unit 3 reads out the recorded video signal and feeds it to the monitor 4, as needed, so that the still picture represented by the video signal is displayed on the monitor 4. This kind of configuration allows both of the two different types of cameras 1 and 2 to shoot the same object Y at the exposure timing synchronous to the emission pulse 142 derived from the release signal 128. Therefore, the still pictures taken by the cameras 1 and 2 are free from a time lag or delay relative to each other. The above system makes it possible in, e.g., a photo studio to see the still picture taken by the camera 2 on the monitor 4 before the development of the film of the camera 1. Hence, the quality of the shot in the dual shoot mode can be effectively evaluated.

In the independent shoot mode, the camera 2 is operated with its built-in strobe, as follows. First, the operator of the camera 2 selects the independent shoot mode on the mode select button 29, and then presses the release button 28 provided on the camera 2. In response, the release signal 154 (waveform a, FIG. 4) identical in timing with the release button of the release button unit 30 is fed from the release button 28 to the system controller 25. Then, the system controller 25 feeds the emission pulse 158 to its built-in strobe while executing the previously mentioned control over the entire camera 2. Further, at the negative-going edge of the release signal 154, the controller 25 delivers to the dual shoot controller 27 the shoot command signal 152 identical in timing with the signal d shown in FIG. 4. The dual shoot controller 27 inverts the polarity of the input signal 152, and then feeds the resulting shoot command signal 126 to the sync signal generator 20. This is followed by the same procedure as described in relation to the dual shoot mode.

The system shown in FIGS. 1A and 1B is constructed to execute dual shooting in synchronism with the emission pulse 142. Alternatively, the release button unit 30 may be so constructed as to deliver, in the dual shoot mode, a release signal 128 similar to the emission pulse 142 to the dual shoot controller 27. In this case, when both the strobe 34 of the camera 1 and the built-in strobe of the camera 2 are held in their OFF state, the cameras 1 and 2 will operate in the ordinary mode.

Figure 5B:
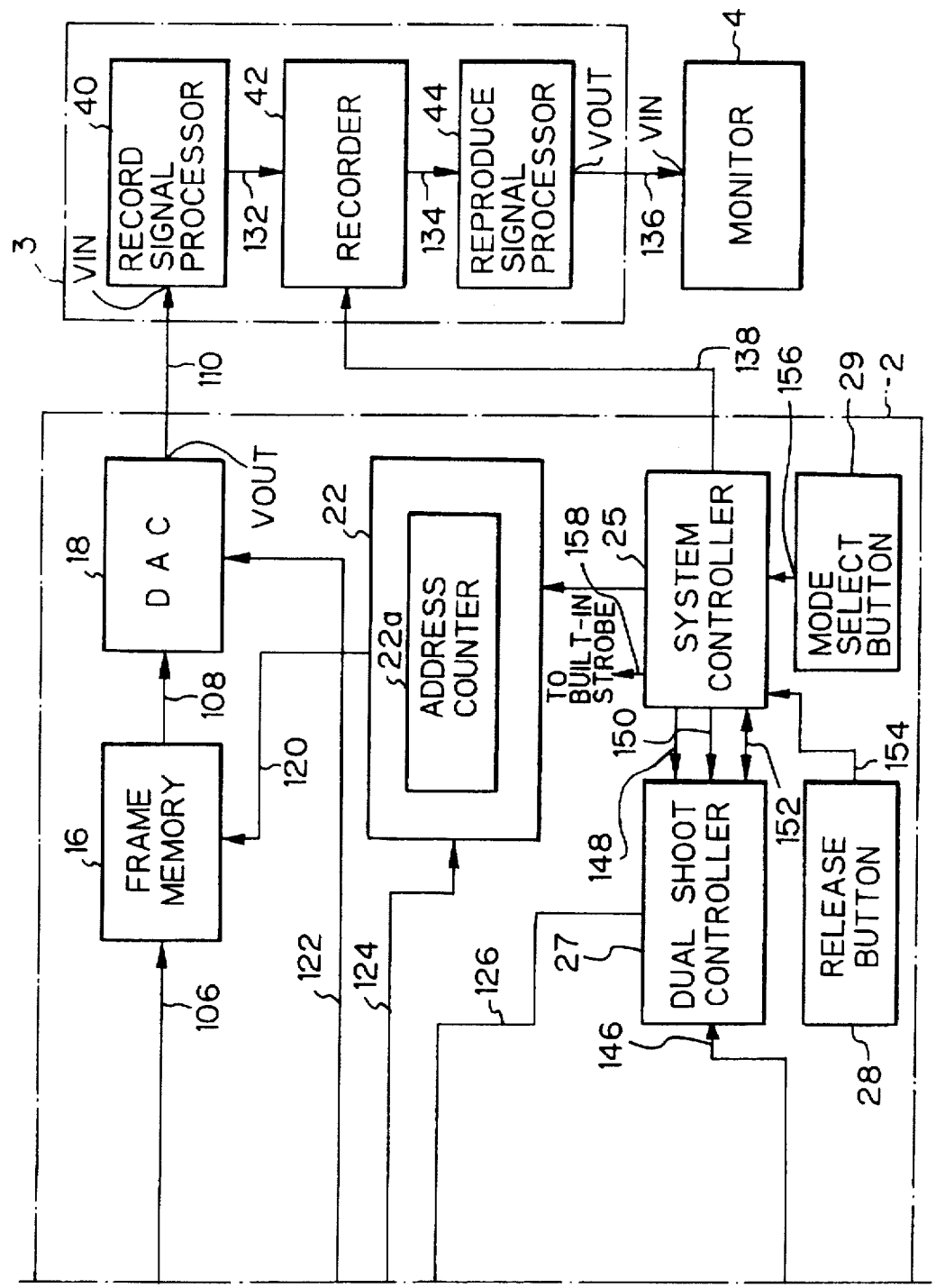
Figure 6:
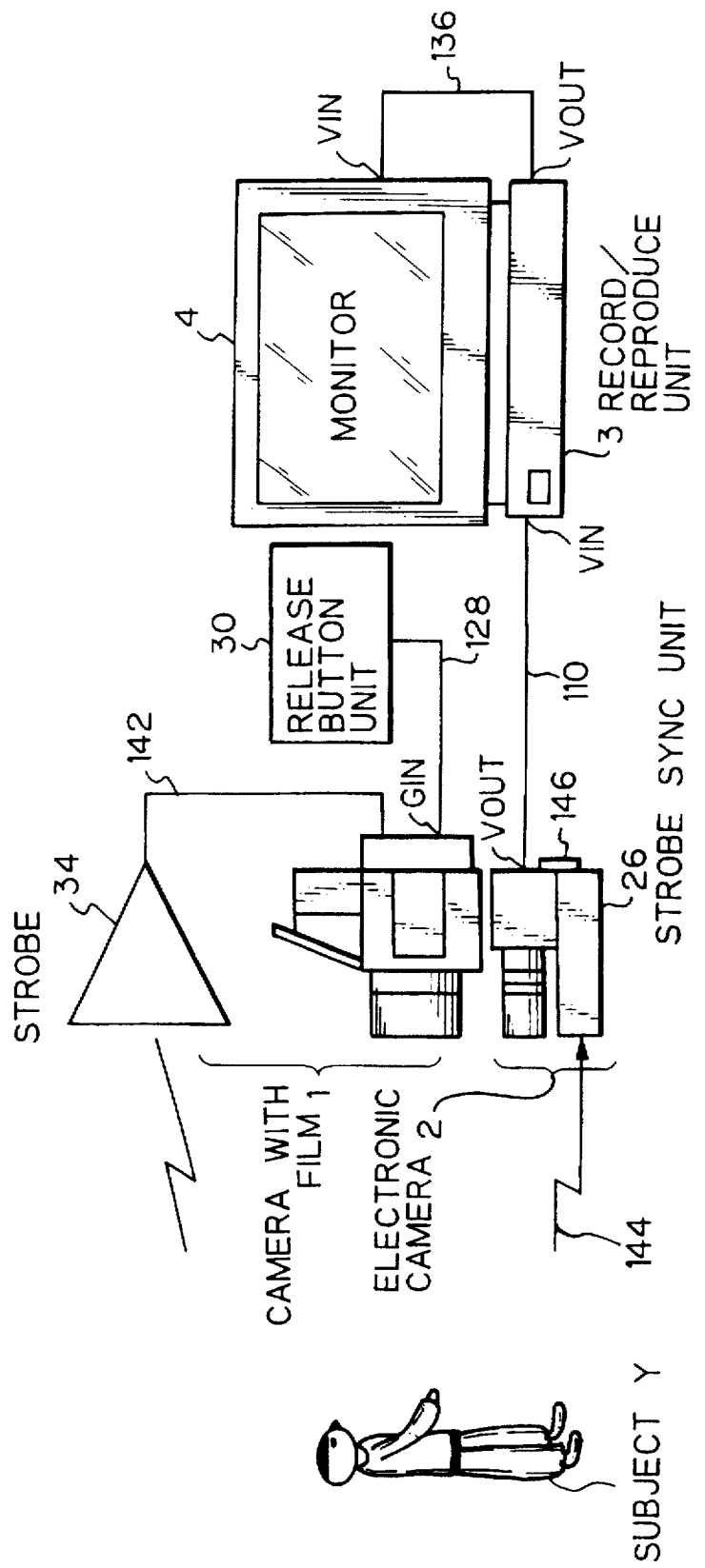
FIG. 6 is a view showing how various units, including the embodiment of FIGS. 5A and 5B, are connected in a system.

An alternative embodiment of the present invention will be described with reference to FIGS. 5A, 5B and 6. As shown, this embodiment differs from the previous embodiment in that the control line 142 between the two cameras 1 and 2 is absent, and in that a strobe sync unit 26 is additionally included in the camera 2 and connected to the dual shoot controller 27. In FIGS. 5A, 5B and 6, the same or similar constituents as or to the constituents shown in FIGS. 1A, 1B and 2 are designated by the same reference numerals, and a detailed description thereof will not be made in order to avoid redundancy.

In FIGS. 1A, 1B and 2, in the dual shoot mode, when the release button of the release button unit 30 is pressed, the shutter 38 of the camera 1 is fully opened while the strobe 34 is caused to emit light. At the same time, the emission pulse 142 is sent from the camera 1 to the camera 2 so as to fully open the electronic shutter of the camera 2. By contrast, in FIGS. 5A, 5B and 6, when the camera 1 causes the strobe 34 to emit while fully opening its shutter 38, the strobe sync unit 26 of the camera 2 receives a reflection 144 resulting from the emission of the strobe 34. In response, the strobe sync unit 26 generates a strobe sync pulse 146 and thereby fully opens the electronic shutter of the camera 2. As a result, the cameras 1 and 2 perform stroboscopic shooting at the same time. Again, the camera 2 delivers one frame of video signal derived from the stroboscopic shot to the recording/reproducing unit 3. In response, the unit 3 stores the video signal, reproduces it, and then feeds the reproduced video signal to the monitor 4. Likewise, the camera 1 records the still picture in the film thereof.

Specifically, as shown in FIG. 5A and 5B, the output of the strobe sync unit 26 is connected to the dual shoot controller 27 by the control line 146. The strobe sync unit 26 is implemented by, e.g., a photosensor. Upon receiving the reflection 144 derived from the emission of the strobe 34, the sync unit 26 generates the strobe sync pulse identical in timing with the previously stated emission pulse 142 (waveform d, FIG. 4). The strobe sync pulse is fed from the sync unit 26 to the dual shoot controller 27 via the output 146 of the unit 26. In response, the controller 27 delivers a pulse of the same timing as described with reference to FIGS. 1A and 1B to the sync signal generator 20 and system controller 25.

In operation, assume that the cameras 1 and 2 are operated in the dual stroboscopic shoot mode in order to shoot the same subject Y at the same time. First, the operator selects the dual shoot mode on the mode select button 29, and then presses the release button of the release button unit 30. In response, the release button unit 30 sends the release signal 128 (waveform a, FIG. 4) to the strobe controller 32 and shutter controller 36 of the camera 1. Upon receiving the signal 128, the shutter controller 36 feeds the drive signal (waveform b, FIG. 4) to the shutter 38, thereby causing it to fully open. At the same time, the strobe controller 32 delivers the emission pulse 142 (waveform d, FIG. 4) to the strobe 34, and thereby causes it to emit light. As a result, the film of the camera 1 is exposed imagewise to record the desired subject Y. On the other hand, the strobe sync unit 26 of the camera 2 generates the strobe sync pulse 146 upon receiving the reflection 144. The pulse 146 from the sync unit 26 is applied to the dual shoot controller 27. In response, the controller 27 sends the shoot command signals 126 and 152 to the sync signal generator 20 and system controller 25, respectively. The procedure to follow is identical with the procedure described with reference to FIGS. 1A, 1B and 2, and will not be described in order to avoid redundancy.

In the above configuration, the camera 2 is capable of shooting the subject Y at the exposure timing synchronous to the strobe sync pulse 146 which is derived from the emission of the strobe 34 of the camera 1. Therefore, the still picture produced by the camera 2 is free from a time lag relative to the still picture produced by the camera 1. The system, like the previous system, allows the still picture taken by the camera 2 to be seen on the monitor 4 before the development of the film of the camera 1. This promotes an effective evaluation of the picture quality in a photo studio or similar facility.

Figure 7B:
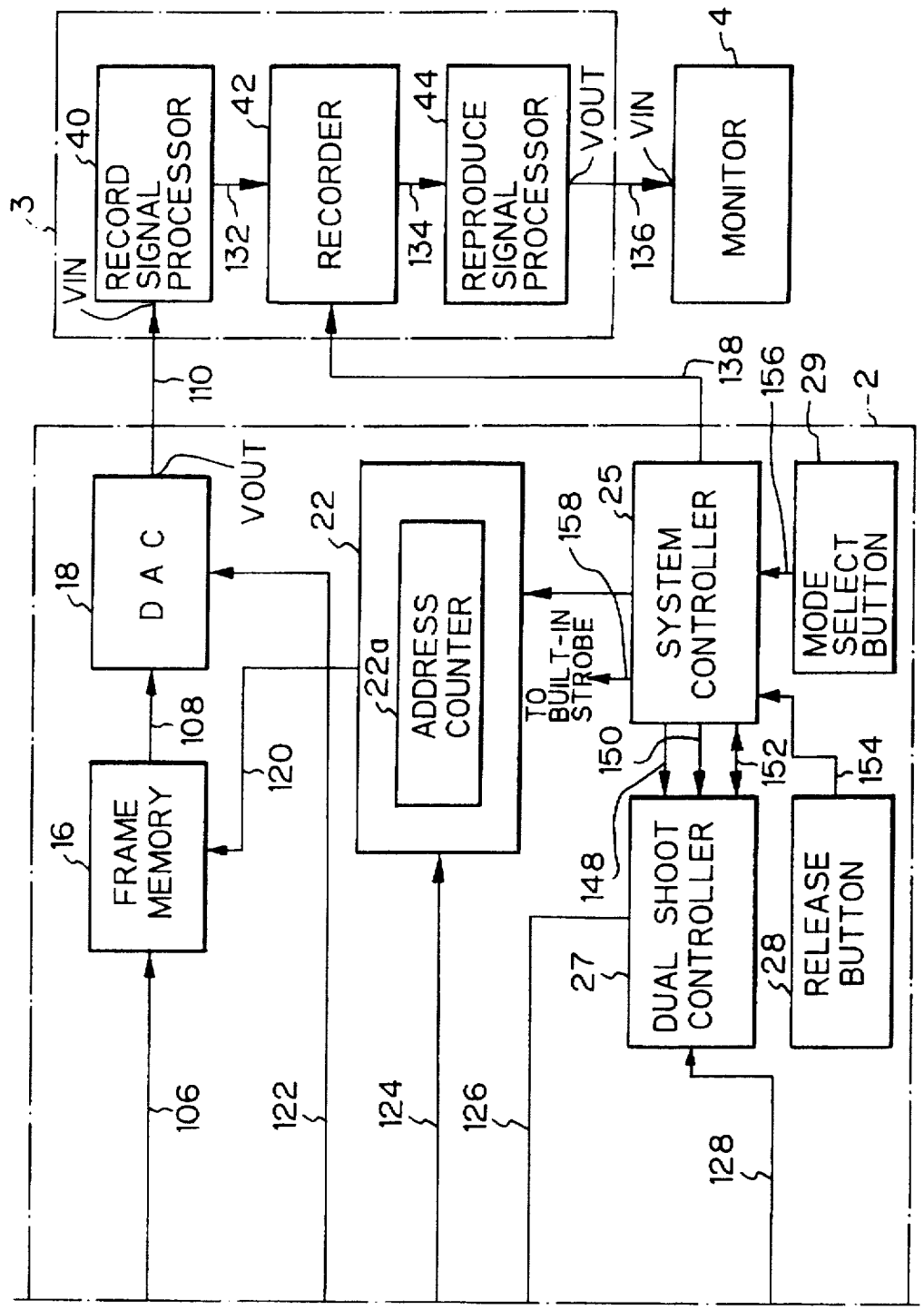
Figure 8:
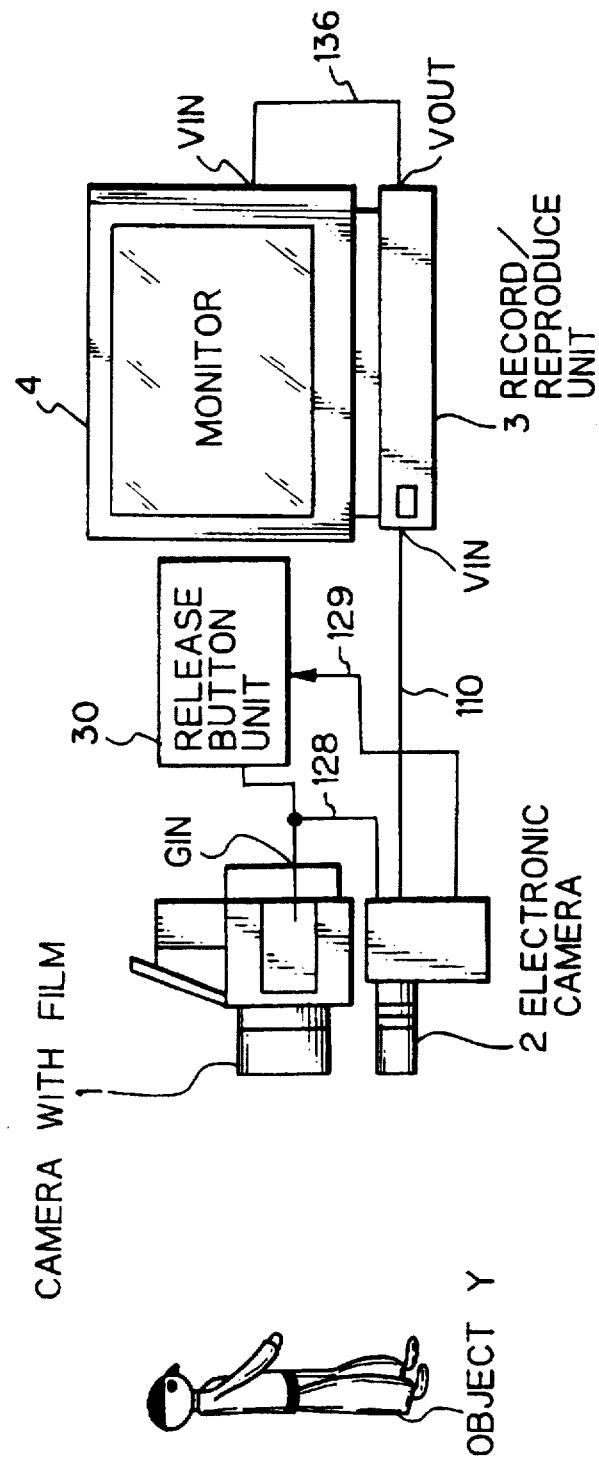
FIG. 8 is a view showing how various units, including the embodiment of FIGS. 7A and 7B, are connected in a system.

Referring to FIGS. 7A, 7B, and 8, another alternative embodiment of the present invention will be described. This embodiment is different from the embodiment shown in FIGS. 1A, 1B and 2 in the following respects. As shown, the control line 128 connects the release button unit 30 not only to the camera 1 but also to the camera 2, thereby replacing the control line 142 of FIGS. 1A, 1B and 2. An additional control line 129 connects the camera 2 to the release button unit 30 in order to send a release permit signal, which will be described, to the camera 2. A release permit signal generator 21 for generating the above signal is additionally included in the camera 2 and is connected to the sync signal generator 20. It will be seen that when the strobes of the cameras 1 and 2 both are in the OFF state, the cameras 1 and 2 are each operable in the ordinary shoot mode using the shutter. In FIGS. 7A, 7B and 8, the same or similar constituents as or to the constituents shown in FIGS. 1A, 1B and 2 are designated by the same reference numerals, and a detailed description thereof will not be made in order to avoid redundancy.

As shown in FIG. 7A, the release permit signal generator 21 receives the release signal 128 from the camera 1, and receives a vertical sync signal 160 and a horizontal sync signal 162 from the sync signal generator 20. In response, the signal generator 21 generates the release permit signal representative of a period in which the shutter can be released. The release permit signal is sent to the release button unit 30 over the control line 129.

Figure 9:
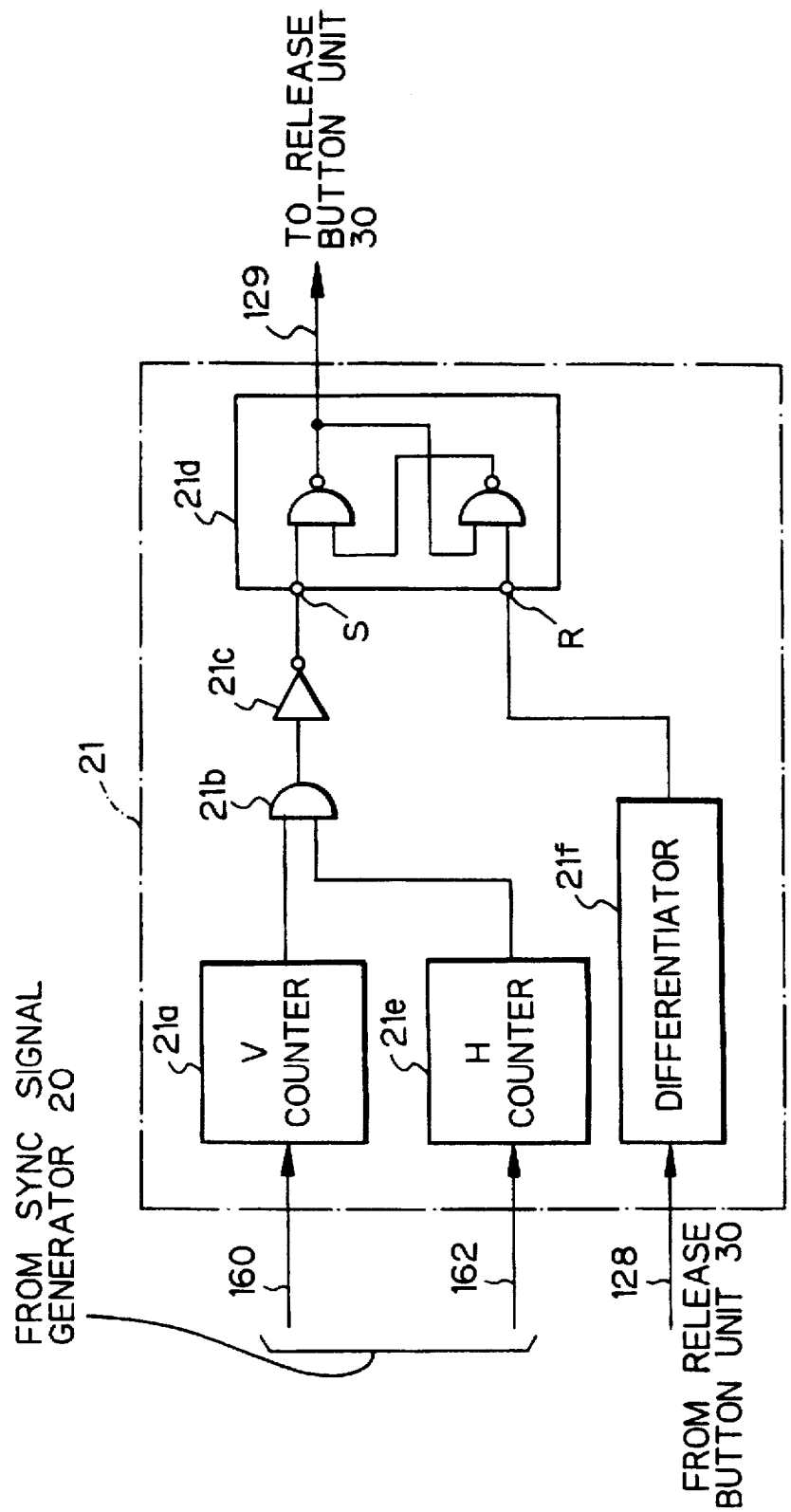
FIG. 9 is a block diagram schematically showing a specific configuration of a release permit signal generator included in the embodiment of FIGS. 7A and 7B.
Figure 11:
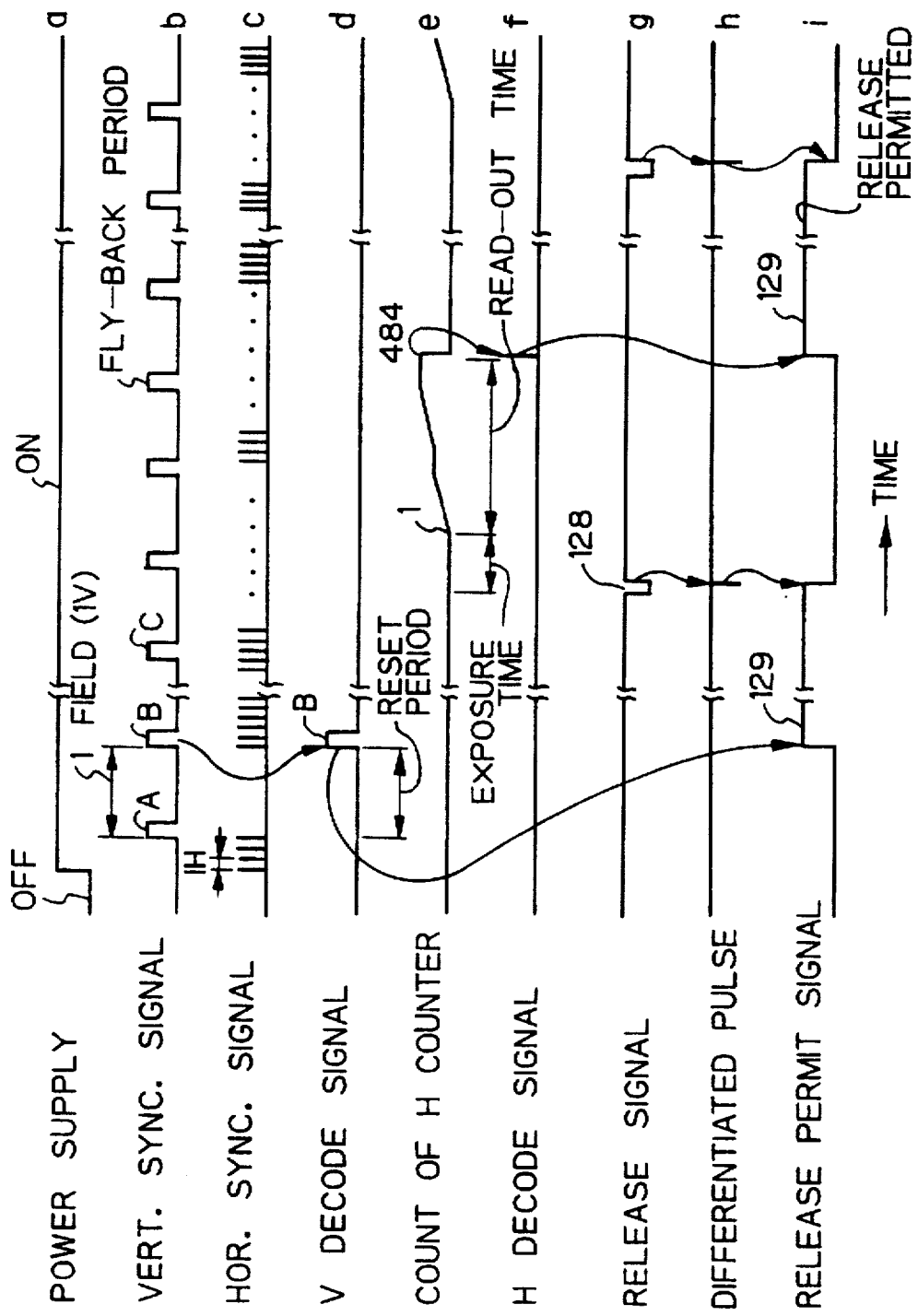
FIG. 11 is a timing chart representative of the waveforms of signals generated in a dual shoot mode in the embodiment of FIGS. 7A and 7B.

FIG. 9 shows a specific configuration of the permit signal generator 21. As shown, the generator 21 is made up of a V (Vertical) counter 21a, a biinput OR gate 21b, an inverter 21c, a set-reset flip-flop 21d, an H (Horizontal) counter 21e, and a differentiator 21f. After the power-up of the camera 2, the V counter 21a counts a predetermined number of vertical sync signals 160 (waveform b, FIG. 11) coming in through its input 160. In this embodiment, the V counter 21a decodes the second fly-back portion B of the signals 160, and then feeds the decoded flay-back portion B (waveform d, FIG. 11) to one input of the biinput OR gate 21b. The reason why the V counter 21a decodes the second fly-back portion B is that in the embodiment the interval between the first fly-back portion A and the second fly-back portion B, i.e., a period of one field is used to initialize or reset the memory and other constituents of the camera 2. If a period of two fields, for example, is necessary for initialization, the V counter 2 may decode the third fly-back period C.

The H counter 21e counts the horizontal sync signals 162 coming in through its input 162 and greater in number than the lines which the read counter of the imaging device 10 counts. In the embodiment, the H counter 21e decodes the 484th horizontal sync signal which is greater than the count assigned to the read counter of the imaging device 10 by 1 (one). The decoded horizontal sync signal (waveform f, FIG. 11) is applied to the other input of the biinput OR gate 21b. Specifically, in the case where one field of video signal is read out of the imaging device 1, the H counter 21e may decode the 243rd horizontal sync signal; that is, the decode timing is open to choice so long as it occurs after the video signal has been read out of the imaging device 10.

The OR gate 21b produces an OR of the output of the V counter 21a and that of the H counter 21e. The OR is fed to the set input terminal S of the flip-flop 21d via the inverter 21c. In the embodiment, the differentiator 21f differentiates the trailing edge of the release signal 128 (waveform g, FIG. 11) received from the release button unit 30, thereby producing a differentiated pulse (waveform h, FIG. 11). The differentiated pulse is fed to the reset input terminal R of the flip-flop 21d. The flip-flop 21d produces the release permit signal (waveform i, FIG. 11) on its output 129 on the basis of the above set signal and reset signal. In the permit signal i shown in FIG. 11, the consecutive high levels are representative of the periods in which the shutter can be released. During these periods, the imaging device 10 is basically held in the previously mentioned pinning state. It is to be noted that the reset pulse should only appear slightly later than the negative-going edge of the release signal 128 (waveform g, FIG. 11) and should disappear at the end of the exposure.

Figure 10:
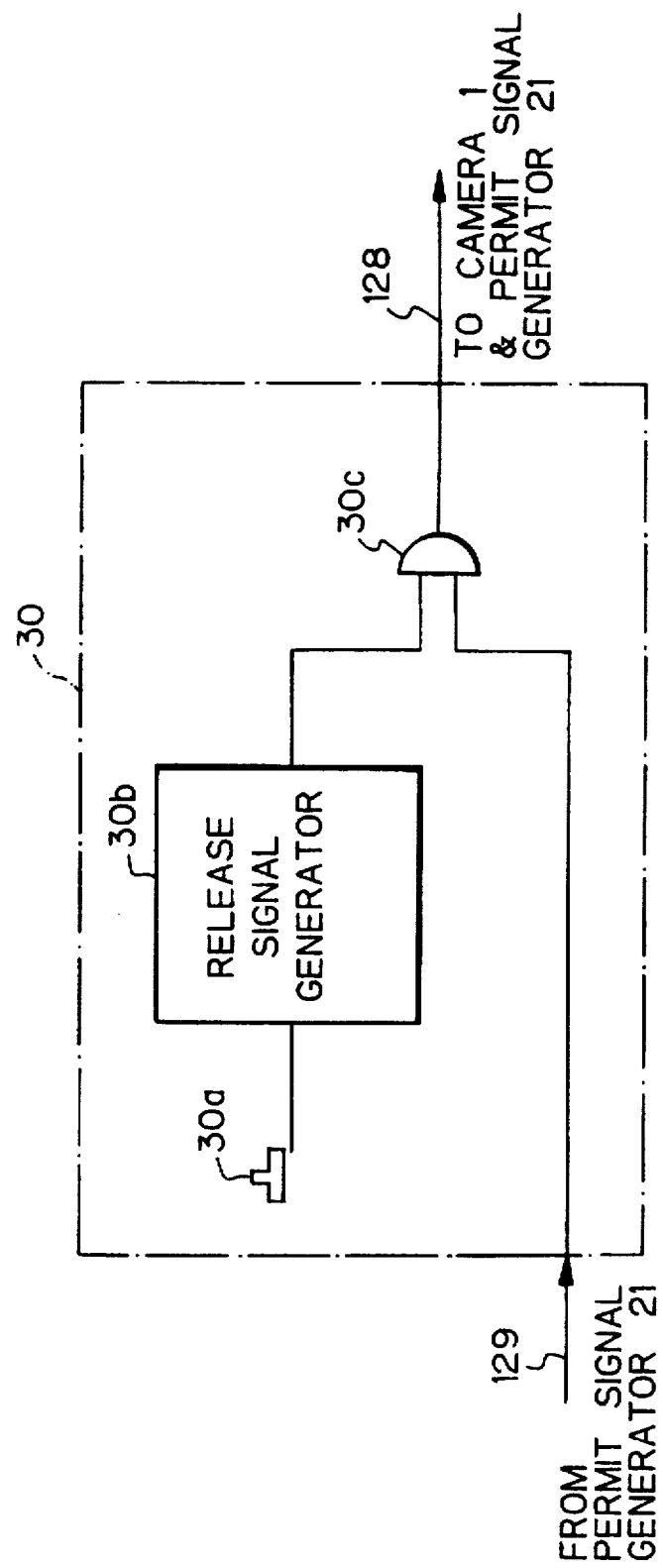
FIG. 10 is a schematic block diagram showing a specific configuration of a release button unit included in the embodiment of FIGS. 7A and 7B.

FIG. 10 shows a specific configuration of the release button unit 30 of FIG. 7. As shown, the unit 30 has a release button 30a, a release signal generator 30b, and a biinput AND gate 30c. The release signal generator 30b is connected to one end of the AND gate 30c. The control line 129 is connected to the release permit signal generator 21 at one end, and to the other input of the AND gate 30c at the other end. The output of the AND gate is connected to the control line 128. This is contrastive to the circuitry of FIGS. 1A and 1B and that of FIGS. 5A and 5B in which the release signal generator 30b is connected to the control line 128 without the intermediary of the AND gate 30c, although not shown specifically.

In FIG. 10, when the release button 30a is pressed, the release signal generator 30b delivers the release signal to one input of the AND gate 30c. The release permit signal 129 from the release permit signal generator 21 is fed to the other input of the AND gate 30c. As a result, the AND gate 30c outputs only the release signal appearing when the release permit signal 129 is in a high level, i.e., when it permits the shutter to be released.

In the circuitry shown in FIGS. 7A and 7B, the camera 2 sends the release permit signal 129 to the release button unit 30, and thereby validates the output signal of the release signal generator 30b (FIG. 10) only when the permit signal permits the shutter to be released. By contrast, the circuitry of FIGS. 1A and 1B and that of FIGS. 5A and 5B both basically permit the shutter to be released even when the video signal is being read out of the imaging device 10. Therefore, the circuitry of FIGS. 7A and 7B is superior to the circuitry of FIGS. 1A and 1B and that of FIGS. 5A and 5B from the reliability standpoint. In addition, the release button unit 30 shown in FIG. 10 has no additional components except for the AND gate 30c, and is different from the conventional complicated synchronizing circuit.

The cameras 1 and 2 are operated simultaneously in the ordinary mode, as distinguished from the strobe mode, in synchronism with the release permit signal output from the camera 2, as follows. The operator selects the dual shoot mode on the mode select button 29, and then presses the button 30a of the release button unit 30. If the operation of the button 30a occurs within the permission period as indicated by the release permit signal 129 (waveform i, FIG. 11), i.e., when the signal 129 is in the high level, then the release signal 128 is sent from the unit 30 to the strobe controller 32 and shutter controller 36 of the camera 1. In response, the shutter controller 36 feeds the drive signal (waveform b, FIG. 4) to the shutter 38, and thereby causes it to fully open. As a result, the film of the camera 1 is exposed to record the subject Y therein. In this mode operation, because the strobe 34 has been brought to the OFF state by the operator beforehand, the strobe controller 32 remains inoperative, and prevents the strobe 34 from emitting. At the same time, the release signal 128 synchronous to the release permit signal 129 is sent to the dual shoot controller 27 of the camera 2. Hence, the controller 27 delivers the shoot command signal 126 to the sync signal generator 20 in response to the signal 128, while feeding the shoot command signal 152 to the system controller 25. The procedure to follow is identical with the procedure stated earlier with reference to FIGS. 1A, 1B and 2.

In summary, in accordance with the present invention, an electronic camera has a shutter control device for feeding a third drive signal synchronous to a release signal output from a second releasing device. The drive signal opens the shutter of a camera loaded with a silver halide sensitive type of film, thereby causing the camera to record a subject in the film. The dual shoot control device also receives the second release signal, and receives a select signal indicative of a dual shoot mode from the control device. In response, the dual shoot control device outputs a second release signal on a first control line. A sync signal generating device feeds, in response to the second release signal, a first drive signal synchronous to the second release signal, but asynchronous to the output signal of reference signal generating device, to an imaging device. As a result, an electronic shutter included in the imaging device is opened to store charges in a cell array in accordance with the picture of the subject. In this manner, the timing of the electronic shutter is asynchronous to the output signal of the reference signal generating device, so that the dual shoot mode using two different types of cameras is free from a time lag. In addition, the control device can control the entire camera without any time lag because it receives the second release signal over the first control line on which a third release signal will appear in an independent shoot mode.

A strobe control device feeds, in response to the second release signal, an emit signal to an emitting device for thereby exposing the film of the camera with the film. A dual shoot control device also receives the emit signal, and receives the select signal indicative of the dual shoot mode from the control device. In response, the dual shoot control device outputs the emit signal on the first control line. The signal generating device feeds, in response to the emit signal appearing on the first control line, a first drive signal synchronous to the emit signal, but asynchronous to the output signal of the reference signal generating device, to the imaging device. As a result, the electronic shutter of the electronic camera is opened to store charges representative of the subject in the cell array. That is, a video signal based on the stroboscopic exposure timing of the silver halide camera is stored in the cell array. Alternatively, the emission timing may be determined by an emission sync signal output from an emission synchronizing device and derived from the emission of the emitting device. In this manner, because the shutter timing of the electronic camera is not synchronous to the output signal of the reference signal generating device, the dual shoot mode operation is free from a time lag. Further, because the control device receives the emission signal over the first control line, it can effectively feed an emission signal to a strobe built in the electronic camera without any time lag, and can control the entire electronic camera.

The second releasing device feeds, on receiving the permit signal from permit signal generating device, the second release signal synchronous to the permit signal to the shutter control device and dual shoot control device. The shutter control means feeds the third drive signal synchronous to the second release signal to the shutter of the silver halide camera, and thereby opens it for shooting the subject. The dual shoot control device also receives the second release signal, and receives the select signal indicative of the dual shoot mode from the control means. In response, the dual shoot control device outputs the second release signal on the first control line. The sync signal generating device receives the second release signal over the first control line, and feeds to the imaging device the first drive signal synchronous to the second release signal, but asynchronous to the output signal of the reference signal generating device. Consequently, charges representative of the subject are stored in the cell array of the imaging device. The dual shoot mode is free from a time lag because the timing of the electronic shutter is not synchronous to the output signal of the reference signal generating device. The control device can effectively control the entire electronic camera without any time lag because it receives the second release signal synchronous to the permit signal received over the first control line. In addition, the second releasing device simply passes the second release signal therethrough when the permit signal is indicative of permission. This eliminates the need for a complicated synchronizing circuit.

The above dual shoot mode allows, in a photo studio by way of example, the still picture taken by the electronic camera to be seen on a monitor before the development of the film of the camera with the film. This promotes the effective evaluation of the picture quality.

While the present invention has been described with reference to the particular illustrative embodiments, it is not to be restricted by the embodiments. It is to be appreciated that those skilled in the art can change or modify the embodiments without departing from the scope and spirit of the present invention. For example, the imaging device 10 and monitor 4 are not limited to the NTSC system, but may be implemented by any other suitable system, e.g., a PAL (Phase Alternation Line) system or a SECAM (Sequential Couleur a Memoire) system. The frame memory 16 may be provided with a capacity greater than one frame in order to store a number of still pictures, in which case the pictures can be continuously written to and read out of the memory. While the recording/reproducing unit 3 has been shown and describing as using a magnetic disk, use may be made of a semiconductor memory which allows digital signals to be directly written and read thereoutof. In this case, the digital signals from the frame memory 16 will be stored in the semiconductor memory. The electronic shutter time, i.e., exposure time may be shorter than or longer than 1/2,000 second (0.5 millisecond) so long as it is adequate for the imaging device 10.

In the system of the embodiment, the camera 2, recording/reproducing unit 3 and monitor 4 are arranged independently of each other. Alternatively, the camera 2 and recording/reproducing unit 3 or the camera 2, unit 3 and monitor 4 can be constructed integrally with each other. The camera 2 and strobe sync unit 26 shown and described as being joined to each other may be separated from each other. In the embodiment, the drive clock 114 starts in synchronism with the first horizontal sync signal $S_0$ (waveform f, FIG. 4) appearing after the time $t_1$ at which the drive signal 112 (waveform c, FIG. 4) goes high. However, the drive clock 114 may be synchronous to any suitable horizontal sync signal following the signal S0. The release button unit 30 may be implemented as an independent unit to be shared by the cameras 1 and 2 or may be implemented by a unit existing on the camera 1. In the dual shooting system, the camera 1 may be replaced with another electronic camera or a camera other than an electronic camera.

What is claimed is:

1. An electronic camera for shooting a subject and recording a still picture representative of the subject, comprising:

first releasing means for outputting a first release signal commanding a start of independent shooting of said electronic camera;

imaging means for opening, in response to a first drive signal, an electronic shutter to thereby store charges representative of the subject in a cell array, and for reading, in response to a second drive signal, at least one frame of analog video signal corresponding to the charges out of said cell array, wherein said imaging means is capable of performing a pinning operation;

dual shoot control means for receiving a stimulating signal commanding a start of dual shooting from the outside of said electronic camera at a first input terminal thereof, developing the received stimulating signal on a first control line, receiving a third release signal at a second input terminal thereof over a second control line, and receiving a select signal indicative of either the independent shooting or the dual shooting at a third input terminal thereof, and for outputting the received stimulating signal through the second input terminal to the second control line if said select signal is indicative of the dual shooting, or for outputting said third release signal to the first control line if said select signal is indicative of the independent shooting;

synchronizing signal generating means, connected to said first control line, for outputting, upon receiving the stimulating signal or said third release signal from said first control line, said first drive signal synchronous to the signal received, and for outputting said second drive signal synchronous to a synchronizing signal, generated by reference signal generating means included in said synchronizing signal generating means, and asynchronous to said first drive signal; and control means for controlling said electronic camera in response to the stimulating signal received over said second control line, and for outputting, in response to said first release signal received from said first releasing means, said third release signal on said second control line while controlling said electronic camera, wherein said control means feeds said select signal indicative of the dual shooting to said dual shoot control means, and wherein said synchronizing signal generating means feeds, upon receiving the stimulating signal, said first drive signal to said imaging means and thereby opens said electronic shutter for shooting the subject, and then feeds to said imaging means said second drive signal starting at a predetermined position of said synchronizing signal, which appears after said electronic shutter has been closed by said first drive signal, and which is synchronous to said synchronizing signal to thereby cause at least one frame of analog video signal to be read out of said cell array.

2. An electronic camera in accordance with claim 1, further comprising second releasing means for outputting a second release signal commanding said electronic camera and a silver halide camera loaded with a silver halide sensitive type of film to start the dual shooting, wherein said silver halide camera comprises shutter control means for outputting, in response to said second release signal, a third drive signal synchronous to said second release signal and for opening and closing a shutter included in said silver halide camera, wherein said dual shoot control means receives said second release signal from said second releasing means at said first input terminal as the stimulating signal, wherein said synchronizing signal generating means receives either said second release signal or said third release signal over said first control line, wherein said control means controls said electronic camera in response to said second release signal received over said second control line, wherein said control means feeds said select signal indicative of the dual shooting to said dual shoot control means, wherein said shutter control means feeds, in response to said second release signal, said third drive signal to said shutter and thereby opens said shutter for shooting the subject, and wherein said synchronizing signal generating means feeds, in response to said second release signal, said first drive signal to said imaging means and thereby opens said electronic shutter for shooting the subject, feeds, in response to said second release signal, said first drive signal to said imaging means and thereby opens said electronic shutter for shooting the subject, and feeds to said imaging means said second drive signal starting at a predetermined position of said synchronizing signal, which appears after said electronic shutter has been closed by said first drive signal, and which is synchronous to said synchronizing signal to thereby cause at least one frame of analog video signal to be read out of said cell array.

3. An electronic camera in accordance with claim 2, wherein said silver halide camera further comprises:

strobe control means for outputting, upon receiving said second release signal from said second releasing means, an emission signal at a timing for causing an emission to occur in synchronism with said second releasing means; and emitting means for emitting light toward the subject in response to said emission signal received from said strobe control means, wherein said dual shoot control means receives said emission signal from said strobe control means on said first input terminal as the stimulating signal, wherein said synchronizing signal generating means receives either said emission signal or said third release signal over said first control line, wherein said control means controls said electronic camera in response to said emission signal received over said second control line, wherein said control means feeds said select signal indicative of the dual shooting to said dual shoot control means, wherein said shutter control means feeds, in response to said second release signal, said third drive signal to said shutter to thereby open said shutter, wherein said strobe control means feeds, in response to said second release signal, said emission signal to said emitting means and thereby causes said emitting means to emit light for shooting the subject, and wherein said synchronizing signal generating means feeds, in response to said emission signal, said first drive signal to said imaging means and thereby opens said electronic shutter for shooting the subject, and then feeds to said imaging means said second drive signal starting at a predetermined position of said synchronizing signal, which appears after said electronic shutter has been closed by said first drive signal, and synchronous to said synchronizing signal and thereby causes at least one frame of video signal to be read out of said cell array.

4. An electronic camera in accordance with claim 3, further comprising emission synchronizing means for receiving a reflection derived from the emission, and for outputting an emission synchronization signal synchronous to the reflection, wherein said dual shoot control means receives said emission synchronization signal from said emission synchronizing means at said first input terminal as the stimulating signal, wherein said synchronizing signal generating means receives either said emission synchronization signal or said third release signal over said first control line, wherein said control means controls said electronic camera in response to said emission synchronization signal received over said second control line, wherein said control means feeds said select signal indicative of the dual shooting to said dual shoot control means, wherein said shutter control means feeds, in response to said second release signal, said third drive signal to said shutter to thereby open said shutter, wherein said strobe control means feeds, in response to said second release signal, said emission signal to said emitting means and thereby causes said emitting means to emit light for shooting the subject, and wherein said synchronizing signal generating means feeds, in response to said emission synchronization signal, said first drive signal to said imaging means and thereby opens said electronic shutter for shooting the subject, and then feeds to said imaging means said second drive signal starting at a predetermined position of said synchronizing signal, which appears after said electronic shutter has been closed by said first drive signal, and synchronous to said synchronizing signal to thereby read at least one frame of analog video signal out of said cell array.

5. An electronic camera in accordance with claim 2, wherein said second releasing means comprises means for outputting, upon receiving a permit signal, said second release signal only for a period in which said permit signal shows that said second release signal is to be output, wherein said electronic camera further comprises permit signal generating means for receiving said second release signal from said second releasing means, and said synchronizing signal from said synchronizing signal generating means, and for generating, based on said signals received, said permit signal which permits shooting in periods other than at least periods in which said synchronizing signal generating means outputs said second drive signal to said imaging means, wherein said control means feeds said select signal indicative of the dual shooting to said dual shoot control means, wherein said shutter control means feeds, in response to said second release signal permitted by said permit signal, said third drive signal to said shutter and thereby opens said shutter for shooting the subject, and wherein said synchronizing signal generating means feeds, in response to said second release signal, said first drive signal to said imaging means and thereby opens said electronic shutter for shooting the subject, and then feeds to said imaging means said second drive signal appearing at a predetermined period of said synchronizing signal, which appears after said electronic shutter has been closed by said first drive signal, and synchronous to said synchronizing means to thereby read at least one frame of analog video signal out of said cell array.

6. An electronic camera in accordance with claim 1, wherein said control means comprises a CPU (Central Processing Unit), and wherein said second control line is connected to one input/output port of the CPU.

7. An electronic camera in accordance with claim 1, wherein said imaging means comprises a CCD (Charge Coupled Device) image sensor.

8. An electronic camera in accordance with claim 1, wherein said synchronizing signal comprises a horizontal synchronizing signal.

9. An electronic camera in accordance with claim 2, wherein said second releasing means is built into said silver halide camera.

10. An electronic camera in accordance with claim 4, wherein said emission synchronizing means is built into said electronic camera.

11. In a camera system comprising an electronic camera for shooting a subject, and recording a still picture representative of the subject, said electronic camera comprising:

first releasing means for outputting a first release signal commanding a start of independent shooting of said electronic camera;

imaging means for opening, in response to a first drive signal, an electronic shutter to thereby store charges representative of the subject in a cell array, and for reading, in response to a second drive signal, at least one frame of analog video signal corresponding to the charges out of said cell array, wherein said imaging means is capable of performing a pinning operation;

dual shoot control means for receiving a stimulating signal commanding a start of dual shooting from the outside of said electronic camera at a first input terminal thereof, developing the received stimulating signal on a first control line, receiving a third release signal at a second input terminal thereof over a second control line, and receiving a select signal indicative of either the independent shooting or the dual shooting at a third input terminal thereof, and for outputting the received stimulating signal through the second input terminal to the second control line if said select signal is indicative of the dual shooting, or for outputting said third release signal to the first control line if said select signal is indicative of the independent shooting;

synchronizing signal generating means, connected to said first control line, for outputting, upon receiving the stimulating signal or said third release signal from said first control line, said first drive signal synchronous to the signal received, and for outputting said second drive signal synchronous to a synchronizing signal, generated by reference signal generating means included in said synchronizing signal generating means, and asynchronous to said first drive signal; and control means for controlling said electronic camera in response to the stimulating signal received over said second control line, and for outputting, in response to said first release signal received from said first releasing means, said third release signal on said second control line while controlling said electronic camera, wherein said control means feeds said select signal indicative of the dual shooting to said dual shoot control means, and wherein said synchronizing signal generating means feeds, upon receiving the stimulating signal, said first drive signal to said imaging means and thereby opens said electronic shutter for shooting the subject, and then feeds to said imaging means said second drive signal starting at a predetermined position of said synchronizing signal, which appears after said electronic shutter has been closed by said first drive signal, and which is synchronous to said synchronizing signal to thereby cause at least one frame of analog video signal to be read out of said cell array.

12. A camera system in accordance with claim 11, further comprising a silver halide camera loaded with a silver halide sensitive type of film, and second releasing means for outputting a second release signal commanding said electronic camera and said silver halide camera to start the dual shooting, wherein said silver halide camera comprises shutter control means for outputting, in response to said second release signal, a third drive signal synchronous to said second release signal and for opening and closing a shutter included in said silver halide camera, wherein said dual shoot control means receives said second release signal from said second releasing means at said first input terminal as the stimulating signal, wherein said synchronizing signal generating means receives either said second release signal or said third release signal over said first control line, wherein said control means controls said electronic camera in response to said second release signal received over said second control line, wherein said control means feeds said select signal indicative of the dual shooting to said dual shoot control means, wherein said shutter control means feeds, in response to said second release signal, said third drive signal to said shutter and thereby opens said shutter for shooting the subject, and wherein said synchronizing signal generating means feeds, in response to said second release signal, said first drive signal to said imaging means and thereby opens said electronic shutter for shooting the subject, feeds, in response to said second release signal, said first drive signal to said imaging means and thereby opens said electronic shutter for shooting the subject, and feeds, to said imaging means, said second drive signal starting at a predetermined position of said synchronizing signal, which appears after said electronic shutter has been closed by said first drive signal, and which is synchronous to said synchronizing signal to thereby cause at least one frame of analog video signal to be read out of said cell array.

13. A camera system in accordance with claim 12, wherein said silver halide camera further comprises:

strobe control means for outputting, upon receiving said second release signal from said second releasing means, an emission signal at a timing for causing an emission to occur in synchronism with said second releasing means; and emitting means for emitting light toward the subject in response to said emission signal received from said strobe control means, wherein said dual shoot control means receives said emission signal from said strobe control means on said first input terminal as the stimulating signal, wherein said synchronizing signal generating means receives either said emission signal or said third release signal over said first control line, wherein said control means controls said electronic camera in response to said emission signal received over said second control line.

wherein said control means feeds said select signal indicative of the dual shooting to said dual shoot control means, wherein said shutter control means feeds, in response to said second release signal, said third drive signal to said shutter to thereby open said shutter, wherein said strobe control means feeds, in response to said second release signal, said emission signal to said emitting means and thereby causes said emitting means to emit light for shooting the subject, and wherein said synchronizing signal generating means feeds, in response to said emission signal, said first drive signal to said imaging means and thereby opens said electronic shutter for shooting the subject, and then feeds to said imaging means said second drive signal starting at a predetermined position of said synchronizing signal, which appears after said electronic shutter has been closed by said first drive signal, and which is synchronous to said synchronizing signal and thereby causes at least one frame of video signal to be read out of said cell array.

14. A camera system in accordance with claim 13, further comprising emission synchronizing means for receiving a reflection derived from the emission, and for outputting an emission synchronization signal synchronous to the reflection, wherein said dual shoot control means receives said emission synchronization signal from said emission synchronizing means at said first input terminal as the stimulating signal, wherein said synchronizing signal generating means receives either said emission synchronization signal or said third release signal over said first control line, wherein said control means controls said electronic camera in response to said emission synchronization signal received over said second control line, wherein said control means feeds said select signal indicative of the dual shooting to said dual shoot control means, wherein said shutter control means feeds, in response to said second release signal, said third drive signal to said shutter to thereby open said shutter, wherein said strobe control means feeds, in response to said second release signal, said emission signal to said emitting means and thereby causes said emitting means to emit light for shooting the subject, and wherein said synchronizing signal generating means feeds, in response to said emission synchronization signal, said first drive signal to said imaging means and thereby opens said electronic shutter for shooting the subject, and then feeds to said imaging means, said second drive signal starting at a predetermined position of said synchronizing signal, which appears after said electronic shutter has been closed by said first drive signal, and which is synchronous to said synchronizing signal to thereby read at least one frame of analog video signal out of said cell array.

15. A camera system in accordance with claim 12, wherein said second releasing means comprises means for outputting, upon receiving a permit signal, said second release signal only for a period in which said permit signal shows that said second release signal is to be output, wherein said electronic camera further comprises permit signal generating means for receiving said second release signal from said second releasing means, and said synchronizing signal from said synchronizing signal generating means, and for generating, based on said signals received, said permit signal which permits shooting in periods other than at least periods in which said synchronizing signal generating means outputs said second drive signal to said imaging means, wherein said control means feeds said select signal indicative of the dual shooting to said dual shoot control means, wherein said shutter control means feeds, in response to said second release signal permitted by said permit signal, said third drive signal to said shutter and thereby opens said shutter for shooting the subject, and wherein said synchronizing signal generating means feeds, in response to said second release signal, said first drive signal to said imaging means and thereby opens said electronic shutter for shooting the subject, and then feeds to said imaging means said second drive signal appearing at a predetermined period of said synchronizing signal, which appears after said electronic shutter has been closed by said first drive signal, and which is synchronous to said synchronizing means to thereby read at least one frame of analog video signal out of said cell array.

16. In a camera system comprising an electronic camera in accordance with claim 11, said electronic camera comprising outputting means for receiving at least one frame of analog video signal from said imaging means, for transforming the one frame of analog signal to a predetermined recordable video signal, and for outputting the recordable video signal, wherein said camera system comprises a recording device for receiving the predetermined recordable video signal from said outputting means, and for recording the received video signal.

17. A camera system in accordance with claim 16, wherein said recording device includes a reproducing device for reproducing and outputting the recorded video signal, and wherein said system further comprises a monitor for displaying an image represented by the reproduced video signal.

18. A method of causing an electronic camera to shoot a subject with an imaging device capable of performing a pinning operation, and to record a still picture representative of the subject, said method comprising the steps of:

outputting a select signal for selecting either dual shooting using said electronic camera and a silver halide camera loaded with a silver halide sensitive type of film, or independent shooting using said electronic camera;

outputting a first release signal commanding a start of the independent shooting;

controlling, in response to a stimulating signal commanding a start of the dual shooting received on a first control line from the outside, the entire electronic camera, or outputting, in response to said first release signal, a third release signal on the first control line and controlling the entire electronic camera;

receiving said stimulating signal at a first input terminal, developing the received stimulating signal on a second control line, receiving said select signal at a third input terminal thereof, and outputting, if said select signal is indicative of the dual shooting, said stimulating signal to the first control line or outputting, if said select signal is indicative of the independent shooting, said third release signal to said second control line;

outputting, in response to said stimulating signal or said third release signal received from said second control line, a first drive signal synchronous to the received signal;

opening, in response to said first drive signal, an electronic shutter of said imaging device to thereby store charges representative of the subject in a cell array of said imaging device;

outputting, when said electronic shutter is closed by said first drive signal, a second drive signal starting at a preselected position of a synchronizing signal, which appears after said electronic shutter has been closed by said first drive signal, and which is synchronous to a reference signal which is asynchronous to said first drive signal; and reading, in response to said second drive signal, at least one frame of analog video signal corresponding to the charges stored in said cell array.

19. A method in accordance with claim 18, further comprising the steps of:

outputting a second release signal for commanding said electronic camera and said silver halide camera to start the dual shooting; and outputting, in response to said second release signal, a third drive signal synchronous to said second release signal and for opening and closing a shutter of said silver halide camera;

wherein said stimulating signal comprises said second release signal.

20. A method in accordance with claim 19, further comprising the steps of:

outputting, in response to said second release signal, an emission signal for causing an emission to occur in synchronism with said second release signal; and emitting light toward the subject in response to said emission signal;

wherein said stimulating signal comprises said emission signal.

21. A method in accordance with claim 20, further comprising the step of outputting, in response to a reflection from the subject derived from the light, an emission synchronizing signal synchronous to the reflection, wherein said stimulating signal comprises said emission synchronizing signal.

22. A method in accordance with claim 19, further comprising the steps of:

outputting, in response to a permit signal, said second release signal only for a period in which said permit signal shows that said second release signal is to be output; and outputting, in response to said second release signal and said synchronizing signal, said permit signal which permits shooting in periods other than at least periods in which said second drive signal is output to said imaging means;

wherein said stimulating signal comprises said second release signal permitted by said permit signal.

23. An electronic camera for shooting a subject, and recording a still picture representative of the subject, comprising:

a first releasing device for outputting a first release signal commanding a start of independent shooting of said electronic camera;

an imaging device for opening, in response to a first drive signal, an electronic shutter to thereby store charges representative of the subject in a cell array, and for reading, in response to a second drive signal, at least one frame of analog video signal corresponding to the charges out of said cell array, said imaging device being capable of performing a pinning operation;

a dual shoot control device for receiving a stimulating signal commanding a start of a dual shooting from the outside of said electronic camera at a first input terminal thereof, developing the received stimulating signal on a first control line, receiving a third release signal at a second input terminal thereof over a second control line, and receiving a select signal indicative of either the independent shooting or the dual shooting at a third input terminal thereof, and for outputting the received stimulating signal through the second input terminal to the second control line if said select signal is indicative of the dual shooting, or for outputting said third release signal to the first control line if said select signal is indicative of the independent shooting;

a synchronizing signal generating device connected to said first control line, for outputting, upon receiving the stimulating signal or said third release signal from said first control line, said first drive signal synchronous to the signal received, and for outputting said second drive signal synchronous to a synchronizing signal, which is generated by a reference signal generating device included in said synchronizing signal generating device, and which is asynchronous to said first drive signal; and a control device for controlling said electronic camera in response to the stimulating signal received over said second control line, and for outputting, in response to said first release signal received from said first releasing device, said third release signal on said second control line while controlling said electronic camera, wherein said control device feeds said select signal indicative of the dual shooting to said dual shoot control device, and wherein said synchronizing signal generating device feeds, upon receiving the stimulating signal, said first drive signal to said imaging device and thereby opens said electronic shutter for shooting the subject, and then feeds to said imaging device said second drive signal starting at a predetermined position of said synchronizing signal, which appears after said electronic shutter has been closed by said first drive signal, and which is synchronous to said synchronizing signal to thereby cause at least one frame of analog video signal to be read out of said cell array.

24. An electronic camera in accordance with claim 23, further comprising a second releasing device for outputting a second release signal commanding said electronic camera and a silver halide camera loaded with a silver halide sensitive type of film to start the dual shooting.

wherein said silver halide camera comprises a shutter control device for outputting, in response to said second release signal, a third drive signal synchronous to said second release signal and for opening and closing a shutter included in said silver halide camera, wherein said dual shoot control device receives said second release signal from said second releasing device at said first input terminal as the stimulating signal, wherein said synchronizing signal generating device receives either said second release signal or said third release signal over said first control line, wherein said control device controls said electronic camera in response to said second release signal received over said second control line, wherein said control device feeds said select signal indicative of the dual shooting to said dual shoot control device, wherein said shutter control device feeds, in response to said second release signal, said third drive signal to said shutter and thereby opens said shutter for shooting the subject, and wherein said synchronizing signal generating device feeds, in response to said second release signal, said first drive signal to said imaging device and thereby opens said electronic shutter for shooting the subject, feeds, in response to said second release signal, said first drive signal to said imaging device and thereby opens said electronic shutter for shooting the subject, and feeds, to said imaging device, said second drive signal starting at a predetermined position of said synchronizing signal, which appears after said electronic shutter has been closed by said first drive signal, and which is synchronous to said synchronizing signal to thereby cause at least one frame of analog video signal to be read out of said cell array.

25. An electronic camera in accordance with claim 24, wherein said silver halide camera further comprises:

a strobe control device for outputting, upon receiving said second release signal from said second releasing device, an emission signal at a timing for causing an emission to occur in synchronism with said second releasing means; and an emitting device for emitting light toward the subject in response to said emission signal received from said strobe control device, wherein said dual shoot control device receives said emission signal from said strobe control device on said first input terminal as the stimulating signal, wherein said synchronizing signal generating device receives either said emission signal or said third release signal over said first control line, wherein said control device controls said electronic camera in response to said emission signal received over said second control line, wherein said control device feeds said select signal indicative of the dual shooting to said dual shoot control device, wherein said shutter control device feeds, in response to said second release signal, said third drive signal to said shutter to thereby open said shutter, wherein said strobe control device feeds, in response to said second release signal, said emission signal to said emitting device and thereby causes said emitting device to emit light for shooting the subject, and wherein the synchronizing signal generating device feeds, in response to said emission signal, said first drive signal to said imaging device and thereby opens said electronic shutter for shooting the subject, and then feeds, to said imaging device said second drive signal starting at a predetermined position of said synchronizing signal, which appears after said electronic shutter has been closed by said first drive signal, and which is synchronous to said synchronizing signal and thereby causes at least one frame of video signal to be read out of said cell array.

26. An electronic camera in accordance with claim 25, further comprising an emission synchronizing device for receiving a reflection derived from the emission, and outputting an emission synchronization signal synchronous to the reflection, wherein said dual shoot control device receives said emission synchronization signal from said emission synchronizing device at said first input terminal as the stimulating signal, wherein said synchronizing signal generating device receives either said emission synchronization signal or said third release signal over said first control line, wherein said control device controls said electronic camera in response to said emission synchronization signal received over said second control line, wherein said control device feeds said select signal indicative of the dual shooting to said dual shoot control device, wherein said shutter control device feeds, in response to said second release signal, said third drive signal to said shutter to thereby open said shutter, wherein said strobe control device feeds, in response to said second release signal, said emission signal to said emitting device and thereby causes said emitting device to emit light for shooting the subject, and wherein said synchronizing signal generating device feeds, in response to said emission synchronization signal, said first drive signal to said imaging device and thereby opens said electronic shutter for shooting the subject, and then feeds to said imaging device said second drive signal starting at a predetermined position of said synchronizing signal, which appears after said electronic shutter has been closed by said first drive signal, and which is synchronous to said synchronizing signal to thereby read at least one frame of analog video signal out of said cell array.

27. An electronic camera in accordance with claim 24, wherein said second releasing device comprises a device for outputting, upon receiving a permit signal, said second release signal only for a period in which said permit signal shows that said second release signal is to be output, wherein said electronic camera further comprises a permit signal generating device for receiving said second release signal from said second releasing device, and said synchronizing signal from said synchronizing signal generating device, and for generating, based on said signals received, said permit signal which permits shooting in periods other than at least periods in which said synchronizing signal generating device outputs said second drive signal to said imaging device, wherein said control device feeds said select signal indicative of the dual shooting to said dual shoot control device, wherein said shutter control device feeds, in response to said second release signal permitted by said permit signal, said third drive signal to said shutter and thereby opens said shutter for shooting the subject, and wherein said synchronizing signal generating device feeds, in response to said second release signal, said first drive signal to said imaging device and thereby opens said electronic shutter for shooting the subject, and then feeds, to said imaging device, said second drive signal appearing at a predetermined period of said synchronizing signal, which appears after said electronic shutter has been closed by said first drive signal, and which is synchronous to said synchronizing device to thereby read at least one frame of analog video signal out of said cell array.

* * * * *